US007054849B2

(12) United States Patent
Prokopenko et al.

(10) Patent No.: US 7,054,849 B2
(45) Date of Patent: May 30, 2006

(54) FUNCTIONAL PLANNING SYSTEM

(75) Inventors: Mikhail Prokopenko, Lane Cove (AU); Dong Mei Zhang, Carlingford (AU); Ryszard Kowalczyk, Carlton (AU); Thomas Phillip Alexander Howard, Wamberal (AU); Farhad Fuad Islam, Apex, NC (US); Michael Alexander Oldfield, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/128,481

(22) Filed: Apr. 24, 2002

(65) Prior Publication Data

US 2003/0046255 A1   Mar. 6, 2003

(30) Foreign Application Priority Data

Apr. 24, 2001   (AU) .................................... PR4600

(51) Int. Cl.
 *G06N 5/00* (2006.01)
(52) U.S. Cl. .......................................... 706/46; 706/45
(58) Field of Classification Search ................ 715/733; 434/308; 706/46, 45; 705/10
See application file for complete search history.

(56) References Cited

U.S. PATENT DOCUMENTS 3,981,087 A * 9/1976 Sachs .......................... 434/308
6,134,532 A * 10/2000 Lazarus et al. ................ 705/14
6,661,431 B1 * 12/2003 Stuart et al. ................ 715/733
6,839,680 B1 * 1/2005 Liu et al. ....................... 705/10
6,839,682 B1 * 1/2005 Blume et al. .................. 705/10

FOREIGN PATENT DOCUMENTS

WO       WO98/35297         8/1998

OTHER PUBLICATIONS

Murasaki, Y., et al., "Agent-based New-Generation TV Entertainment System", The Journal of Information Processing Society of Japan, Jul. 19, 2000, vol. 2000, No. 66, pp. 53-60 (English abstract only).

* cited by examiner

*Primary Examiner*—Wilbert L. Starks, Jr.
(74) *Attorney, Agent, or Firm*—Fitzpatrick, Cella, Harper & Scinto

(57) ABSTRACT

A system (50) for earning functional usage patterns of a user of the system (50) and for planning a best sequences of events suitable for a particular user in a particular context is disclosed. Information relating to user decisions, such as the context during which the decision was made and the actual user decision, is gathered by the DTV-agent (36) and delivered to the active avatar agent (37). The learning module (39) operates to identify all generalization patterns from a number of instances. Method (500) then determines which particular decision is most appropriate by comparing the generalization patterns with the current context for which a decision must be made. Clusters of such behavior patterns are formed with each cluster having the same number of matched attributes. A decision selecting process then selects a decision which is most appropriate to the current context from the behavior patterns.

40 Claims, 26 Drawing Sheets

| EPG ID | Program ID | Category ID | Sub-category ID | Title | EPG Channel | Day | Date | Start-Time | Exact Duration | Year Of Make |
|---|---|---|---|---|---|---|---|---|---|---|
| 1 | 1 | 16 | 564 | ferishitei (felicity) no seishun | Wow | Fri | 4/9/99 | 20:00 | 50 | 1999 |
| 2 | 2 | 16 | 564 | Suzuran | Nhk | Mon | 4/5/99 | 8:15 | 15 | 1999 |
| 3 | 3 | 16 | 217 | genroku ryoran | Nhk | Sun | 4/4/99 | 20:00 | 45 | 1999 |
| 4 | 4 | 16 | 564 | nichiyo gekijo/goddo nyu-su | Tbs | Sun | 4/11/99 | 21:00 | 54 | 1999 |
| 5 | 5 | 16 | 563 | abunai ho-kago | Asahi | Mon | 4/12/99 | 20:00 | 54 | 1999 |
| 6 | 6 | 16 | 564 | rippu suteikku (lip stick) | Fuji | Mon | 4/12/99 | 21:00 | 54 | 1999 |
| 7 | 7 | 16 | 519 | Romansu | Nihon | Mon | 4/12/99 | 22:00 | 84 | 1999 |
| 8 | 8 | 16 | 188 | furuhata ninzaburo | Fuji | Tue | 4/13/99 | 21:00 | 69 | 1999 |
| 9 | 9 | 16 | 001 | kizudarake no onna | Fuji | Tue | 4/13/99 | 22:15 | 54 | 1999 |
| 10 | 10 | 16 | 564 | happi ai to kando no monogatari | Tokyo | Wed | 4/14/99 | 20:00 | 54 | 1999 |
| 11 | 11 | 16 | 563 | Naomi | Fuji | Wed | 4/14/99 | 21:00 | 54 | 1999 |
| 12 | 12 | 16 | 564 | aka ga hashiru - to-gei seishun ki | Nhk | Wed | 4/7/99 | 22:00 | 45 | 1999 |
| 13 | 13 | 16 | 519 | semi daburu | Fuji | Wed | 4/14/99 | 22:00 | 54 | 1999 |
| 14 | 14 | 16 | 188 | Maiko san wa meitantei | Asahi | Wed | 4/15/99 | 20:00 | 54 | 1999 |
| 15 | 15 | 16 | 519 | koi no kiseki | Asahi | Thu | 4/15/99 | 21:00 | 69 | 1999 |

Fig. 2

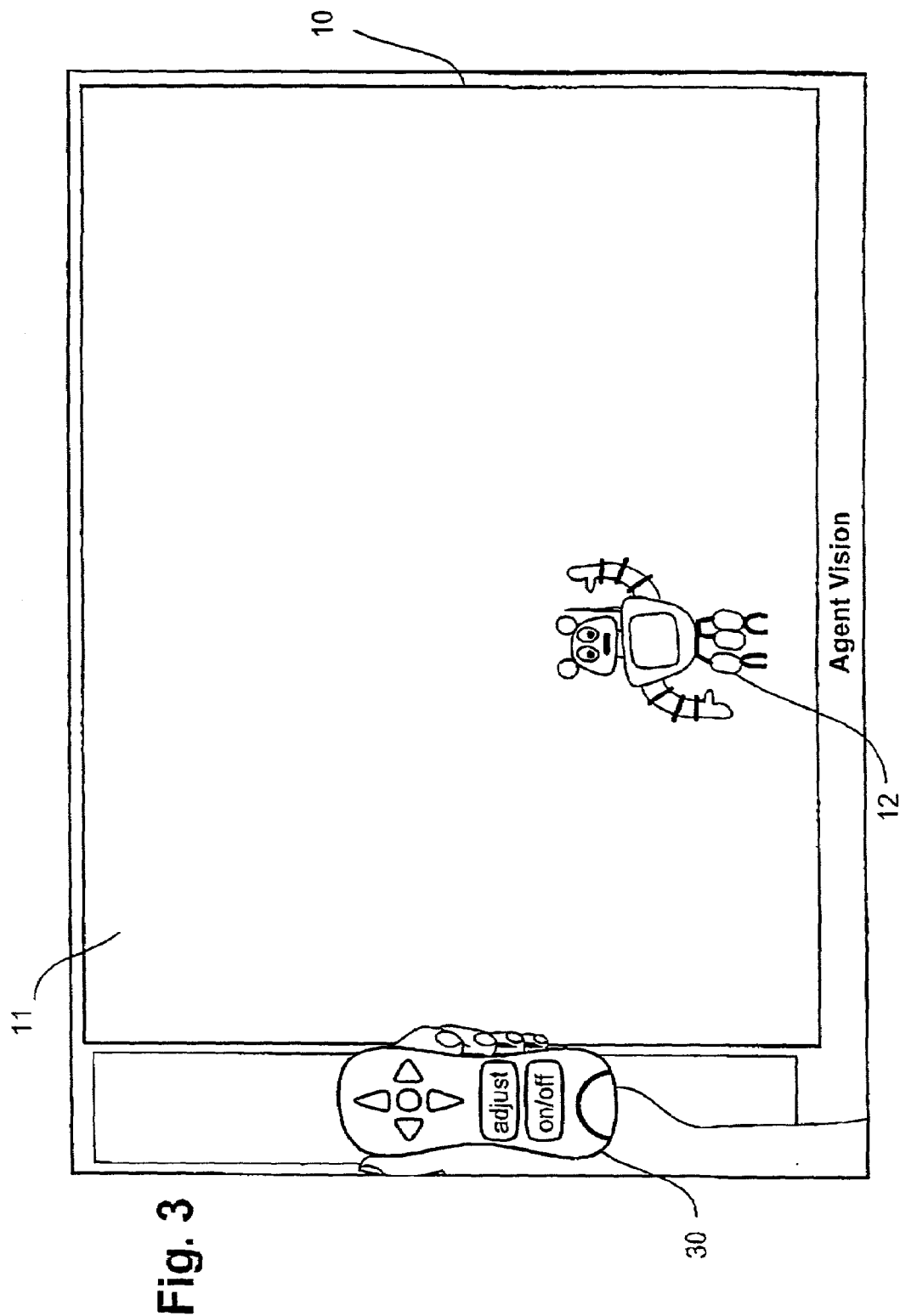

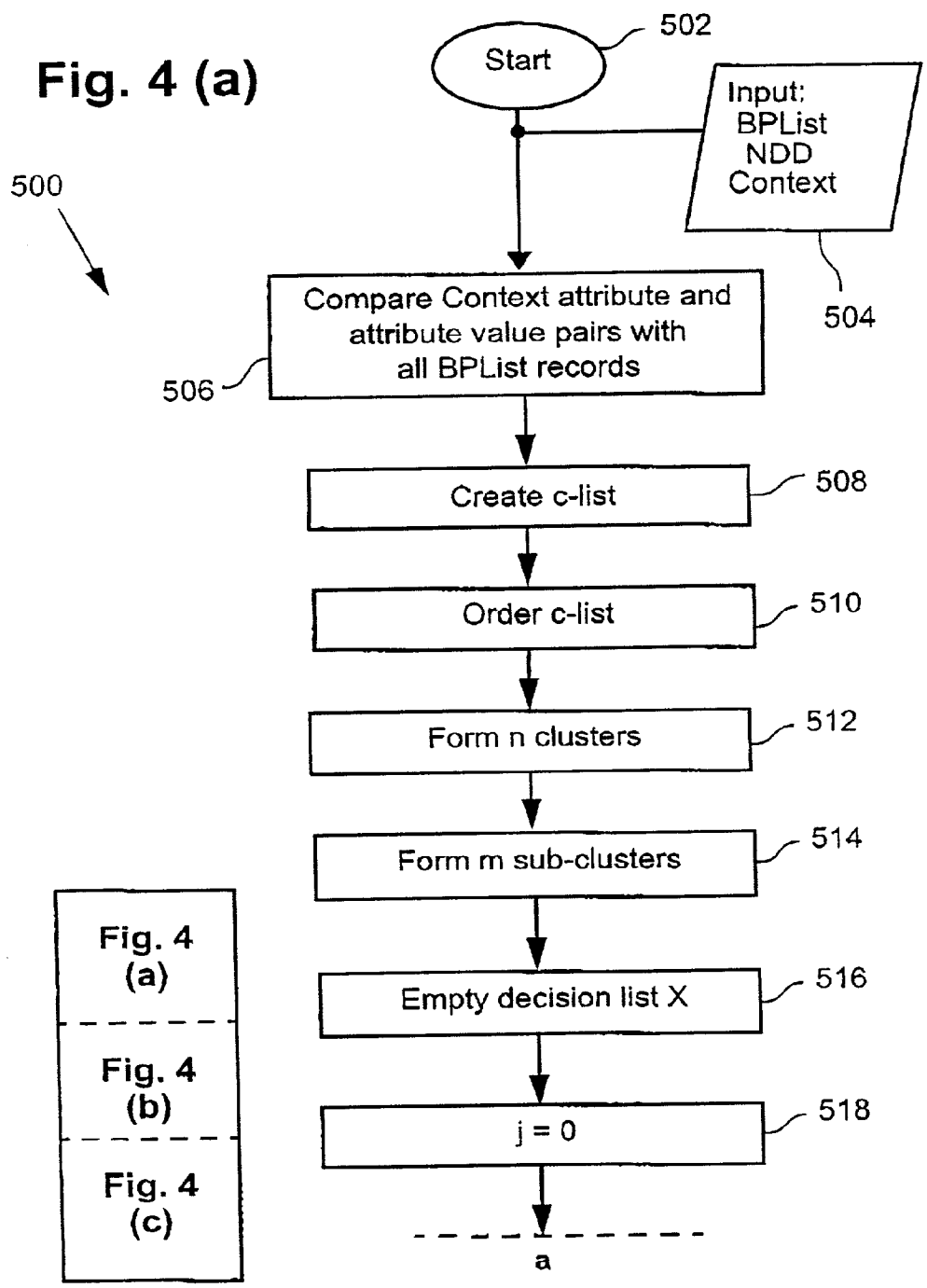

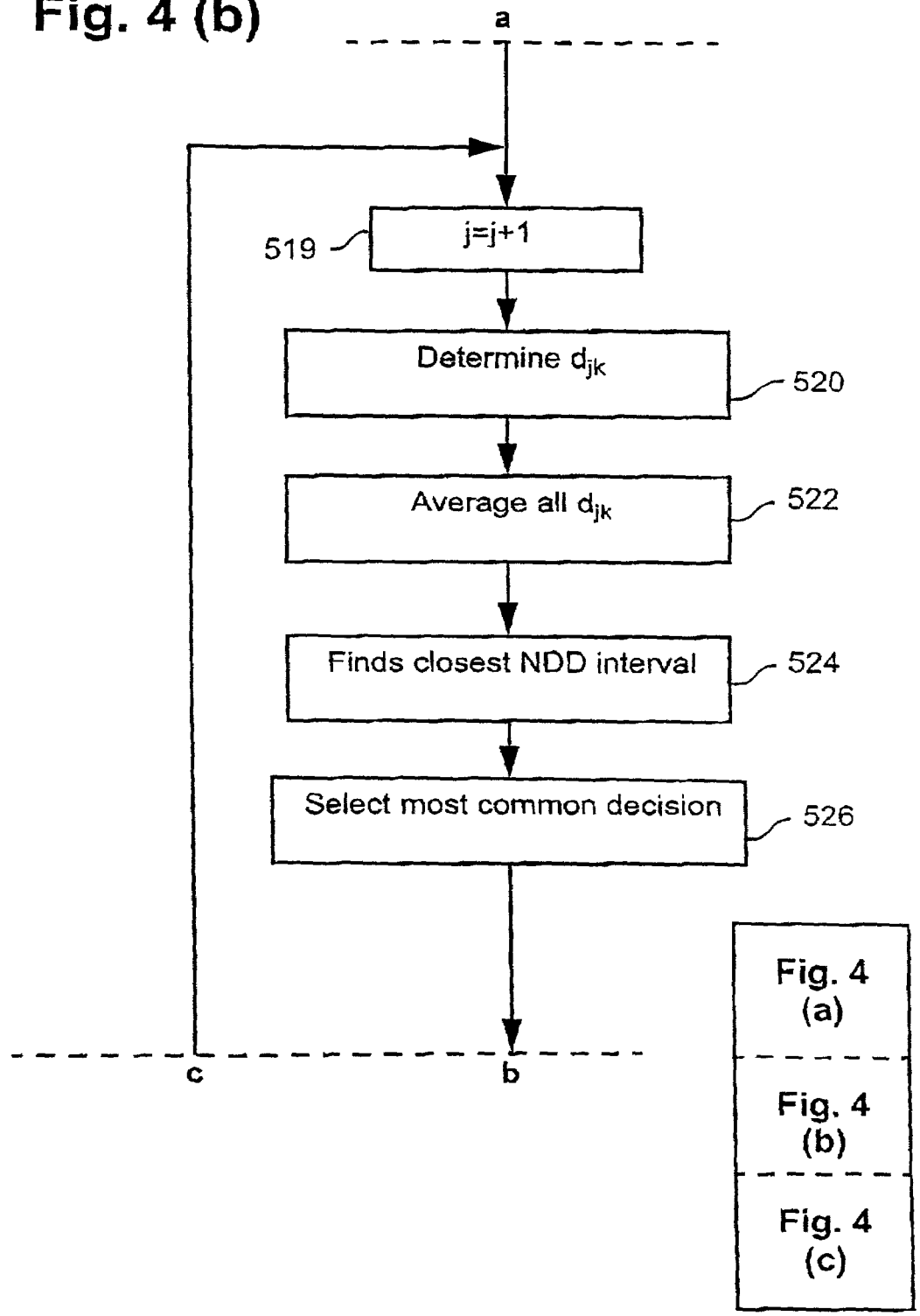

Procedure LEARN

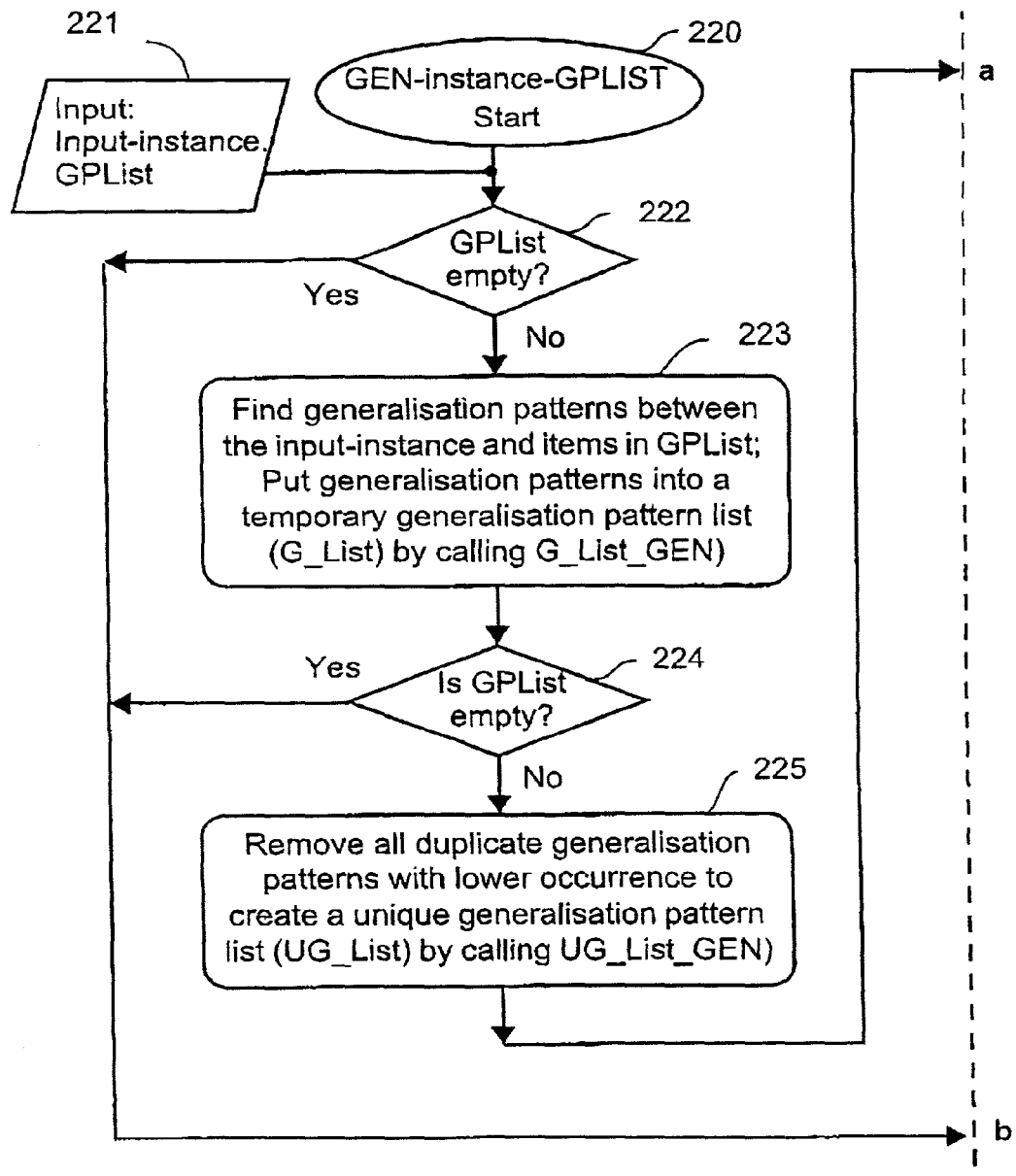
Fig. 7B (a)
Sub-routine
GEN-instance-GPLIST
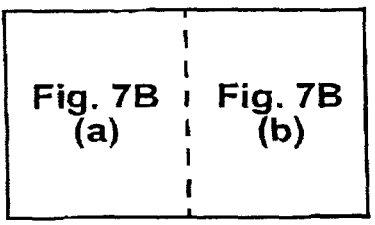

Sub-routine
GEN-instance-GPLIST

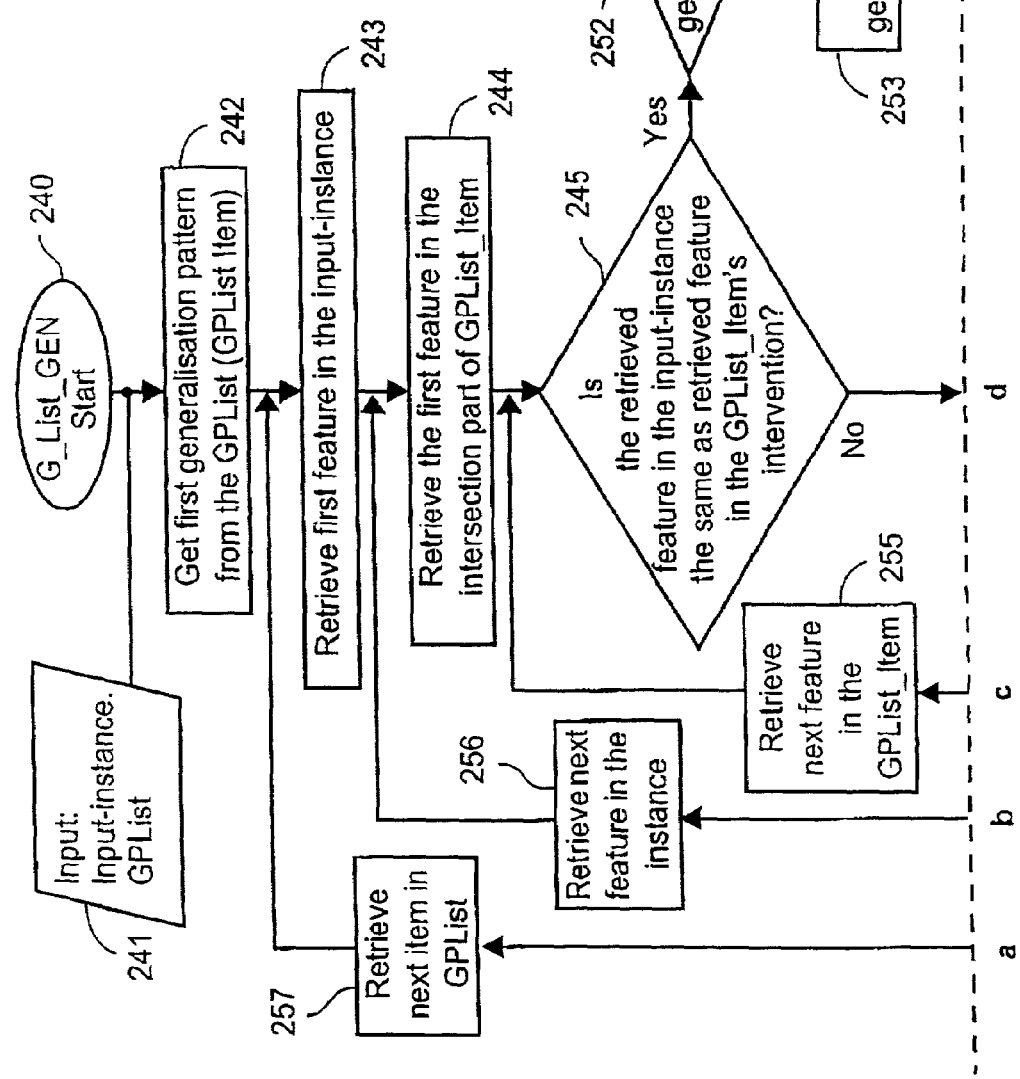

Sub-routine G_List_GEN

Sub-routine UG_List_GEN

Sub-routine GEN-instance-EXAMINED-instanceS

Sub-routine GET-GEN-PATTERN

| DTV Content Category | UMM Content Category | UMM Content Priority | Day | Time of Day | Decision | Frequency | |
|---|---|---|---|---|---|---|---|
| 50 | 0 | 8 | 4 | 2 | 13 | 1 | 71a |
| 50 | 0 | 4 | 4 | 2 | 12 | 1 | |
| 75 | 0 | 2 | 4 | 2 | 11 | 1 | |
| 75 | 0 | 2 | 2 | 0 | 11 | 1 | 71b |
| 50 | 0 | 0 | 4 | 2 | 11 | 1 | |
| 75 | 0 | 0 | 2 | 0 | 11 | 1 | |
| 50 | 0 | 2 | 2 | 0 | 11 | 1 | |
| 50 | 0 | 8 | 2 | 0 | 13 | 1 | 71c |
| 75 | 0 | 4 | 2 | 0 | 12 | 1 | |
| 50 | 0 | 4 | 2 | 0 | 12 | 1 | |
| 50 | 0 | 2 | 4 | 2 | 11 | 1 | |
| 75 | 0 | 0 | 2 | 0 | 11 | 1 | |
| 50 | 0 | 1 | 4 | 2 | -10 | 1 | 71d |
| 50 | 0 | 0 | 2 | 0 | 11 | 1 | |
| 75 | 0 | 8 | 4 | 2 | 13 | 1 | |
| 50 | 0 | 8 | 4 | 0 | 13 | 1 | 71e |
| 50 | 0 | 2 | 2 | 0 | 11 | 1 | |
| 75 | 0 | 4 | 4 | 2 | 12 | 1 | |
| 75 | 0 | 0 | 4 | 2 | 11 | 1 | |
| 50 | 0 | 4 | 4 | 2 | 12 | 1 | |
| 75 | 0 | 0 | 4 | 0 | 11 | 1 | 71f |
| 75 | 0 | 2 | 4 | 0 | 11 | 1 | |
| 75 | 0 | 1 | 4 | 0 | -10 | 1 | 71g |
| 75 | 0 | 8 | 2 | 0 | 13 | 1 | |
| 50 | 0 | 0 | 4 | 2 | 11 | 1 | |
| 75 | 0 | 2 | 2 | 0 | 11 | 1 | 71h |
| 75 | 0 | 2 | 4 | 2 | 11 | 1 | |
| 75 | 0 | 1 | 4 | 2 | -10 | 1 | |
| 50 | 0 | 1 | 2 | 0 | -10 | 1 | 71i |
| 50 | 0 | 8 | 2 | 0 | 13 | 1 | |
| 50 | 0 | 4 | 2 | 0 | 12 | 1 | |
| 75 | 0 | 8 | 4 | 2 | 13 | 1 | |
| 50 | 0 | 0 | 2 | 0 | 11 | 1 | |
| 75 | 0 | 8 | 2 | 0 | 13 | 1 | |
| 50 | 0 | 4 | 2 | 0 | 12 | 1 | |
| 50 | 0 | 2 | 2 | 0 | 11 | 1 | |
| 75 | 0 | 4 | 2 | 0 | 12 | 1 | |

Fig. 9A

| DTV Content Category | UMM Content Category | UMM Content Priority | Day | Time _of_ Day | Decision | Frequency |
|---|---|---|---|---|---|---|
| 50 | 0 | 8 | 4 | 2 | 13 | 1 |
| 50 | 0 | 0 | 2 | 0 | 11 | 1 |
| 75 | 0 | 2 | 2 | 0 | 11 | 1 |
| 75 | 0 | 1 | 2 | 0 | -10 | 1 |
| 50 | 0 | 1 | 2 | 0 | -10 | 1 |
| 50 | 0 | 4 | 4 | 0 | 12 | 1 |
| 75 | 0 | 8 | 2 | 0 | 13 | 1 |
| 75 | 0 | 1 | 4 | 2 | -10 | 1 |
| 50 | 0 | 2 | 4 | 0 | 11 | 1 |
| 75 | 0 | 8 | 4 | 0 | 13 | 1 |
| 50 | 0 | 8 | 2 | 0 | 13 | 1 |
| 50 | 0 | 4 | 2 | 0 | 12 | 1 |
| 75 | 0 | 1 | 2 | 0 | -10 | 1 |
| 50 | 0 | 1 | 4 | 2 | -10 | 1 |
| 75 | 0 | 4 | 4 | 2 | 12 | 1 |
| 50 | 0 | 1 | 2 | 0 | -10 | 1 |
| 75 | 0 | 4 | 2 | 0 | 12 | 1 |
| 50 | 0 | 2 | 2 | 0 | 11 | 1 |
| 75 | 0 | 1 | 2 | 0 | -10 | 1 |
| 50 | 0 | 0 | 2 | 0 | 11 | 1 |
| 50 | 0 | 2 | 4 | 2 | 11 | 1 |
| 75 | 0 | 0 | 2 | 0 | 11 | 1 |
| 50 | 0 | 1 | 2 | 0 | -10 | 1 |
| 75 | 0 | 4 | 4 | 0 | 12 | 1 |
| 50 | 0 | 1 | 4 | 0 | -10 | 1 |
| 50 | 0 | 8 | 2 | 0 | 13 | 1 |

| DTV Content Category | UMM Content Category | UMM Content Priority | Day | Time _of_ Day | Decision | Frequency | |
|---|---|---|---|---|---|---|---|
| 75 | 0 | 8 | 2 | 0 | 13 | 1 | 71l |
| 75 | 0 | 0 | 4 | 2 | 11 | 1 | |
| 75 | 0 | 2 | 2 | 0 | 11 | 1 | |
| 75 | 0 | 1 | 2 | 0 | -10 | 1 | 71m |
| 50 | 0 | 8 | 4 | 0 | 13 | 1 | |
| 75 | 0 | 0 | 2 | 0 | 11 | 1 | |
| 50 | 0 | 4 | 4 | 0 | 12 | 1 | 71n |
| 50 | 0 | 0 | 4 | 0 | 11 | 1 | |
| 50 | 0 | 1 | 4 | 2 | -10 | 1 | |
| 75 | 0 | 4 | 2 | 0 | 12 | 1 | |
| 50 | 0 | 2 | 4 | 0 | 11 | 1 | |
| 50 | 0 | 1 | 4 | 0 | -10 | 1 | |
| 75 | 0 | 8 | 4 | 0 | 13 | 1 | |
| 75 | 0 | 4 | 4 | 0 | 12 | 1 | 71o |
| 50 | 0 | 0 | 4 | 0 | 11 | 1 | |
| 75 | 0 | 0 | 4 | 0 | 11 | 1 | |
| 75 | 0 | 2 | 4 | 0 | 11 | 1 | |
| 75 | 0 | 1 | 4 | 0 | -10 | 1 | 71p |

| DTV Content Category | UMM Content Category | UMM Content Priority | Day | Time_of_Day | Decision | Frequency |
|---|---|---|---|---|---|---|
| 50 | 0 | 8 | 4 | 2 | 13 | 2 |
| 50 | 0 | 4 | 4 | 2 | 12 | 2 |
| 50 | 0 | 0 | 4 | 2 | 11 | 2 |
| 50 | 0 | -1 | 4 | 2 | 11 | 4 |
| 50 | 0 | 2 | 4 | 2 | 11 | 2 |
| 50 | 0 | 1 | 4 | 2 | -10 | 3 |
| -1 | 0 | 8 | 4 | 2 | 13 | 4 |
| 75 | 0 | 8 | 4 | 2 | 13 | 2 |
| -1 | 0 | 4 | 4 | 2 | 12 | 4 |
| 75 | 0 | 4 | 4 | 2 | 12 | 2 |
| -1 | 0 | 0 | 4 | 2 | 11 | 4 |
| -1 | 0 | -1 | 4 | 2 | 11 | 8 |
| 75 | 0 | 0 | 4 | 2 | 11 | 2 |
| -1 | 0 | 2 | 4 | 2 | 11 | 4 |
| 75 | 0 | -1 | 4 | 2 | 11 | 4 |
| 75 | 0 | 2 | 4 | 2 | 11 | 2 |
| -1 | 0 | 1 | 4 | 2 | -10 | 5 |
| 75 | 0 | 1 | 4 | 2 | -10 | 2 |
| 50 | 0 | 8 | -1 | -1 | 13 | 8 |
| -1 | 0 | 8 | -1 | -1 | 13 | 16 |
| 50 | 0 | 8 | 2 | 0 | 13 | 4 |
| 50 | 0 | 4 | -1 | -1 | 12 | 8 |
| -1 | 0 | 4 | -1 | -1 | 12 | 16 |
| 50 | 0 | 4 | 2 | 0 | 12 | 4 |
| 50 | 0 | 0 | -1 | -1 | 11 | 8 |
| 50 | 0 | -1 | -1 | -1 | 11 | 16 |
| -1 | 0 | 0 | -1 | -1 | 11 | 16 |
| -1 | 0 | -1 | -1 | -1 | 11 | 32 |
| 50 | 0 | 0 | 2 | 0 | 11 | 4 |
| 50 | 0 | 2 | -1 | -1 | 11 | 8 |
| -1 | 0 | 2 | -1 | -1 | 11 | 16 |
| 50 | 0 | -1 | 2 | 0 | 11 | 8 |
| 50 | 0 | 2 | 2 | 0 | 11 | 4 |
| 50 | 0 | 1 | -1 | -1 | -10 | 9 |
| -1 | 0 | 1 | -1 | -1 | -10 | 17 |
| 50 | 0 | 1 | 2 | 0 | -10 | 4 |
| 75 | 0 | 8 | -1 | -1 | 13 | 8 |
| -1 | 0 | 8 | 2 | 0 | 13 | 8 |
| 75 | 0 | 8 | 2 | 0 | 13 | 4 |
| 75 | 0 | 4 | -1 | -1 | 12 | 8 |

Fig. 10A

| DTV Content Category | UMM Content Category | UMM Content Priority | Day | Time _of_ Day | Decision | Frequency |
|---|---|---|---|---|---|---|
| -1 | 0 | 4 | 2 | 0 | 12 | 8 |
| 75 | 0 | 4 | 2 | 0 | 12 | 4 |
| 75 | 0 | 0 | -1 | -1 | 11 | 8 |
| 75 | 0 | -1 | -1 | -1 | 11 | 16 |
| -1 | 0 | 0 | 2 | 0 | 11 | 8 |
| -1 | 0 | -1 | 2 | 0 | 11 | 16 |
| 75 | 0 | 0 | 2 | 0 | 11 | 4 |
| 75 | 0 | 2 | -1 | -1 | 11 | 8 |
| -1 | 0 | 2 | 2 | 0 | 11 | 8 |
| 75 | 0 | -1 | 2 | 0 | 11 | 8 |
| 75 | 0 | 2 | 2 | 0 | 11 | 4 |
| 75 | 0 | 1 | -1 | -1 | -10 | 8 |
| -1 | 0 | 1 | 2 | 0 | -10 | 8 |
| 75 | 0 | 1 | 2 | 0 | -10 | 4 |
| 50 | 0 | 8 | 4 | -1 | 13 | 4 |
| -1 | 0 | 8 | 4 | -1 | 13 | 8 |
| 50 | 0 | 8 | -1 | 0 | 13 | 6 |
| -1 | 0 | 8 | -1 | 0 | 13 | 12 |
| 50 | 0 | 8 | 4 | 0 | 13 | 2 |
| 50 | 0 | 4 | 4 | -1 | 12 | 4 |
| -1 | 0 | 4 | 4 | -1 | 12 | 8 |
| 50 | 0 | 4 | -1 | 0 | 12 | 6 |
| -1 | 0 | 4 | -1 | 0 | 12 | 12 |
| 50 | 0 | 4 | 4 | 0 | 12 | 2 |
| 50 | 0 | 0 | 4 | -1 | 11 | 4 |
| 50 | 0 | -1 | 4 | -1 | 11 | 8 |
| -1 | 0 | 0 | 4 | -1 | 11 | 8 |
| -1 | 0 | -1 | 4 | -1 | 11 | 16 |
| 50 | 0 | 0 | -1 | 0 | 11 | 6 |
| 50 | 0 | -1 | -1 | 0 | 11 | 12 |
| -1 | 0 | 0 | -1 | 0 | 11 | 12 |
| -1 | 0 | -1 | -1 | 0 | 11 | 24 |
| 50 | 0 | 0 | 4 | 0 | 11 | 2 |
| 50 | 0 | 2 | 4 | -1 | 11 | 4 |
| -1 | 0 | 2 | 4 | -1 | 11 | 8 |
| 50 | 0 | 2 | -1 | 0 | 11 | 6 |
| -1 | 0 | 2 | -1 | 0 | 11 | 12 |
| 50 | 0 | -1 | 4 | 0 | 11 | 4 |
| 50 | 0 | 2 | 4 | 0 | 11 | 2 |

Fig. 10B

| DTV Content Category | UMM Content Category | UMM Content Priority | Day | Time of Day | Decision | Frequency |
|---|---|---|---|---|---|---|
| 50 | 0 | 1 | 4 | -1 | -10 | 5 |
| -1 | 0 | 1 | 4 | -1 | -10 | 9 |
| 50 | 0 | 1 | -1 | 0 | -10 | 6 |
| -1 | 0 | 1 | -1 | 0 | -10 | 12 |
| 50 | 0 | 1 | 4 | 0 | -10 | 2 |
| 75 | 0 | 8 | 4 | -1 | 13 | 4 |
| 75 | 0 | 8 | -1 | 0 | 13 | 6 |
| -1 | 0 | 8 | 4 | 0 | 13 | 4 |
| 75 | 0 | 8 | 4 | 0 | 13 | 2 |
| 75 | 0 | 4 | 4 | -1 | 12 | 4 |
| 75 | 0 | 4 | -1 | 0 | 12 | 6 |
| -1 | 0 | 4 | 4 | 0 | 12 | 4 |
| 75 | 0 | 4 | 4 | 0 | 12 | 2 |
| 75 | 0 | 0 | 4 | -1 | 11 | 4 |
| 75 | 0 | -1 | 4 | -1 | 11 | 8 |
| 75 | 0 | 0 | -1 | 0 | 11 | 6 |
| 75 | 0 | -1 | -1 | 0 | 11 | 12 |
| -1 | 0 | 0 | 4 | 0 | 11 | 4 |
| -1 | 0 | -1 | 4 | 0 | 11 | 8 |
| 75 | 0 | 0 | 4 | 0 | 11 | 2 |
| 75 | 0 | 2 | 4 | -1 | 11 | 4 |
| 75 | 0 | 2 | -1 | 0 | 11 | 6 |
| -1 | 0 | 2 | 4 | 0 | 11 | 4 |
| 75 | 0 | -1 | 4 | 0 | 11 | 4 |
| 75 | 0 | 2 | 4 | 0 | 11 | 2 |
| 75 | 0 | 1 | 4 | -1 | -10 | 4 |
| 75 | 0 | 1 | -1 | 0 | -10 | 6 |
| -1 | 0 | 1 | 4 | 0 | -10 | 4 |
| 75 | 0 | 1 | 4 | 0 | -10 | 2 |

Fig. 10C

| Cluster | Sub cluster | DTV Content Category | UMM Content Category | UMM Content Priority | Day | Time of Day | Decision | Freq. | $d_{jk}$ |
|---|---|---|---|---|---|---|---|---|---|
| j=1 | k=1 | -1 | 0 | 8 | 4 | 2 | 0 | 7 | $d_{11}$ |
|  |  | -1 | 0 | 8 | 4 | 2 | 13 | 3 |  |
|  | k=2 | 50 | 0 | 8 | 4 | -1 | 11 | 4 | $d_{12}$ |
|  |  | 50 | 0 | 8 | 4 | -1 | 0 | 1 |  |
|  | k=3 | -1 | 0 | 8 | 4 | 2 | 12 | 6 | $d_{13}$ |
|  | k=4 | 50 | 0 | -1 | -1 | 2 | 13 | 2 | $d_{14}$ |
|  | k=5 | 50 | 0 | 8 | 4 | 2 | 11 | 2 | $d_{15}$ |
| j=2 | k=1 | 50 | 0 | 8 | -1 | -1 | 11 | 3 | $d_{21}$ |
|  |  | 50 | 0 | 8 | -1 | 2 | 0 | 1 |  |
|  | k=2 | 50 | 0 | -1 | -1 | 2 | 13 | 3 | $d_{22}$ |

Fig. 11A

| Cluster | Sub cluster | DTV Content Category | UMM Content Category | UMM Content Priority | Day | Time of Day | Decision | Freq. | $d_{jk}$ |
|---|---|---|---|---|---|---|---|---|---|
| j=1 | k=1 | -1 | 0 | 8 | 4 | 2 | 11 | 7 | $d_{11}$ |
| | | -1 | 0 | 8 | 4 | 2 | 13 | 3 | |
| | k=2 | 50 | 0 | 8 | 4 | -1 | 11 | 4 | $d_{12}$ |
| | | 50 | 0 | 8 | 4 | -1 | 0 | 1 | |
| | k=3 | -1 | 0 | 8 | 4 | 2 | 0 | 6 | $d_{13}$ |
| | k=4 | 50 | 0 | 8 | -1 | 2 | 12 | 7 | $d_{14}$ |
| | k=5 | 50 | 0 | -1 | 4 | 2 | 0 | 2 | $d_{15}$ |
| j=2 | k=1 | 50 | 0 | 8 | -1 | -1 | 11 | 3 | $d_{21}$ |
| | | 50 | 0 | 8 | -1 | -1 | 0 | 1 | |
| | k=2 | 50 | 0 | -1 | -1 | 2 | 13 | 3 | $d_{22}$ |

Fig. 11B

FUNCTIONAL PLANNING SYSTEM

FIELD OF THE INVENTION

The present invention relates to a system having artificial intelligence, and more particularly to a system for making context-based decisions.

BACKGROUND

Watching television is an everyday activity in a large number of households, and provides for a source of entertainment from a range of program content such as sport and movies, as well as news and actuality programs (eg. documentaries and lifestyle). With the advent of Digital Television (DTV), the home television has become the main interface with the outside world, in that the Internet may be browsed using the television, on-line shopping may be done, and electronic messages (e-mail) may be received through the television.

Traditionally, a user/viewer sets a large number of "User Preferences" dictating to the DTV how content should be displayed. For example, this may include settings as to whether the user wishes to be notified when e-mail arrives. Furthermore, the user may wish for messages to be automatically displayed in a secondary window. However, such user preferences are not static and may be dependent upon various factors. Such factors may include for example the nature of the program that the user is watching when the e-mail came in, the priority of the message etc. This is undesirable, as the user is therefore required, when setting the "User Preferences" to predict the most likely scenario that may occur, or alternatively, make the most conservative selection.

SUMMARY OF THE INVENTION

It is an object of the present invention to substantially overcome, or at least ameliorate, one or more disadvantages of existing arrangements.

According to a first aspect of the invention there is provided a method of determining a decision within a specified context, said method comprising the steps of:

(a) receiving user behaviour patterns, each said behaviour pattern including attribute information, a user decision and frequency of occurrence;

(b) comparing each attribute of said specified context with each of said attribute information of said behaviour patterns to determine the number of matched attributes;

(c) forming groups of said behaviour patterns based upon the number of matched attributes; and (d) performing a decision selecting process for the group having the highest number of said matched attributes to thereby select a decision which is most appropriate to said specified context from said behaviour patterns.

According to another aspect of the invention, there is provided a method of determining a decision within a specified context, said method comprising the steps of:

(a) receiving user behaviour patterns, each said behaviour pattern including a user decision having an assigned decision value and frequency of occurrence;

(b) comparing said specified context with each of sad behaviour patterns to determine a number of intersections for each of said behaviour patterns with said specified context;

(c) forming groups of said behaviour patterns, each of said groups having a same number of said intersections;

(d) for each of said groups, forming sub-groups of said behaviour patterns, with each of said sub-groups comprising unique intersections;

(e) for the group having a highest number of said intersections, calculating an average of said decision values corresponding to those behaviour patterns having a highest frequency of occurrence in said corresponding sub-groups;

(f) determining a decision interval from a predefined group of decision intervals that is closest to said average; and (g) selecting a decision from said sub-group that is within said determined decision interval, said selected decision having a highest frequency of occurrence.

According to another aspect of the invention there is provided an apparatus for performing any one of the above methods.

According to yet another aspect of the invention there is provided a program stored on a computer medium for performing any one of the above methods.

The invention resides in the manner in which a decision is determined given the context of the decision and previous user behaviour, that is, previous decisions made during previous contests.

BRIEF DESCRIPTION OF THE DRAWINGS

One or more embodiments of the present invention are described hereinafter with reference to the drawings, in which:

FIG. 2 is an extract from a typical Electronic Program Guide;

FIG. 3 is an illustration of an animated character displayed on a display screen of the system in FIG. 1A;

FIGS. 9A and 9B, of which 9B consists of separately labeled parts 9B(a) and 9B(b), show a table containing example instance entries;

FIGS. 10A to 10C show a table containing behaviour patterns created from the instances shown in FIGS. 9A and 9B; and FIGS. 11A and 11B each show an example list of contextualised records.

DETAILED DESCRIPTION INCLUDING BEST MODE

Figure 1A:
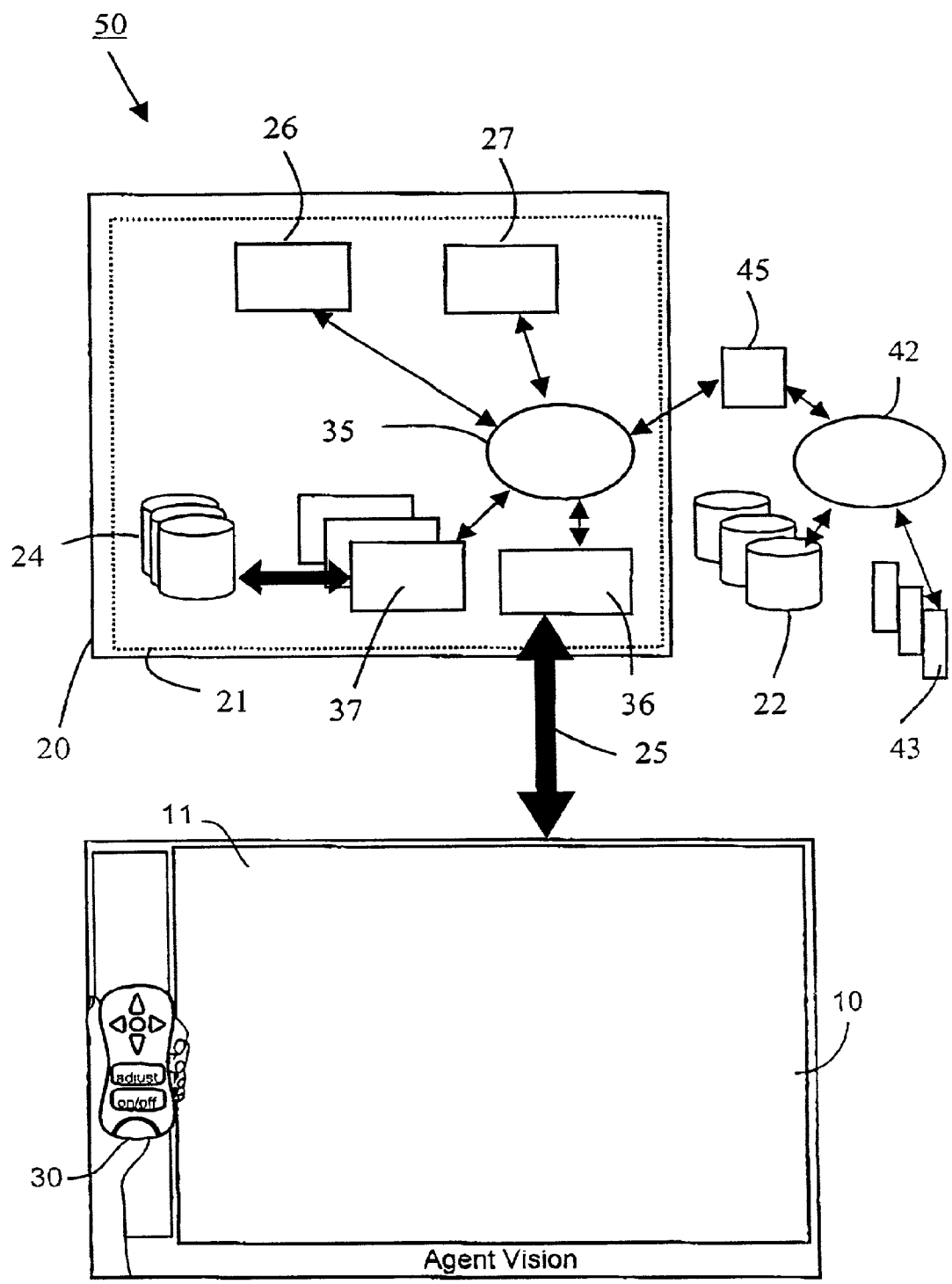
FIG. 1A is a schematic representation of a system for learning functional user behaviour patterns and for planning optimal sequences of events suitable for a particular user in a particular context.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result.

The present specification also discloses an apparatus for performing the operations of the methods. Such apparatus may be specially constructed for the required purposes, or may comprise a general-purpose computer or other device selectively activated or reconfigured by a computer program stored in the computer. The algorithms and displays presented herein are not inherently related to any particular computer or other apparatus. Various general-purpose machines may be used with programs in accordance with the teachings herein. Alternatively, the construction of more specialised apparatus to perform the required method steps may be appropriate. The structure of a conventional general-purpose computer will appear from the description below.

Where reference is made in any one or more of the accompanying drawings to steps and/or features, which have the same reference numerals, those steps and/or features have for the purposes of this description the same function(s) or operation(s), unless the contrary intention appears.

FIG. 1A shows a schematic representation of a system 50 for learning functional usage patterns of a user of the system and for planning a best sequences of events suitable for a particular user in a particular context. The system 50 comprises a digital television (DTV) 10 connected through interconnection 25 to a "set top" box 20. A DTV-agent system 21 is preferably formed within the "set top" box 20. In use, the user interacts with the DTV-agent system 21 using a remote control device 30. The DTV-agent system 21 may alternatively be integrated into the DTV 10 or incorporated into a personal computer 100 such as that seen in FIG. 8 and appropriately interfaced with the DTV 10.

Figure 8:
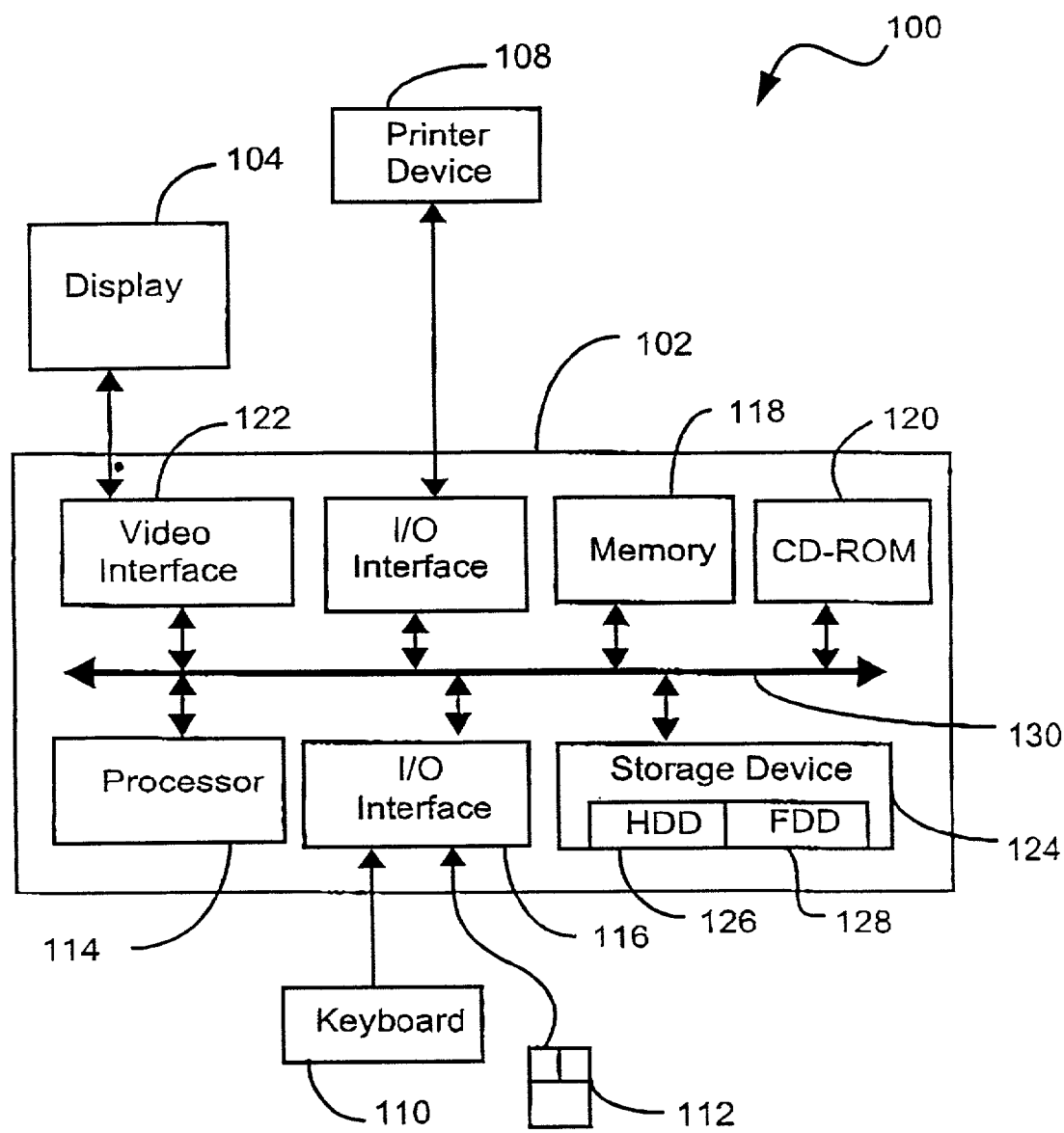
FIG. 8 is a schematic block diagram of a general purpose computer upon which an embodiment of the present invention can be practiced.

The computer system 100 shown in FIG. 8 comprises a computer module 102, input devices such as a keyboard 110 and mouse 112, and output devices including a printer 108 and a display device 104. The computer module 102 typically includes at least one processor unit 114, a memory unit 118, for example formed from semiconductor random access memory (RAM) and read only memory (ROM), input/output (I/O) interfaces including a video interface 122, and an I/O interface 116 for the keyboard 110 and mouse 112. A storage device 124 is provided and typically includes a hard disk drive 126 and a floppy disk drive 128. A magnetic tape drive (not illustrated) may also be used A CD-ROM drive 120 is typically provided as a non-volatile source of data. The components 114 to 128 of the computer module 102, typically communicate via an interconnected bus 130 and in a miner which results in a conventional mode of operation of the computer system 100 known to those in the relevant art.

Typically, an application program is resident on the hard disk drive 126, and is read and controlled in its execution by the processor 114. Intermediate storage of the program may be accomplished using the semiconductor memory 118, possibly in concert with the hard disk drive 126. In some instances, the application program may be supplied to the viewer encoded on a CD-ROM or floppy disk and read via the corresponding drive 120 or 128, or alternatively may be read by the viewer from a network via a modem device (not illustrated). Still further, the software can also be loaded into the computer system 100 from other computer readable medium including magnetic tape, a ROM or integrated circuit, a magneto-optical disk, a radio or infra-red transmission channel between the computer module 102 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

Referring again to FIG. 1A, in the preferred implementation, the DTV-agent system 21 includes a DTV-agent 36 for controlling the DTV 10, an electronic storage device 26, a unified messaging module (UMM) 27, and a number of avatar-agents 37. An "agent" in this regard is typically implemented by a computer program module, configured to perform a desired function or produce a desired effect. An Inter-agent-server (IAS) 35 manages communications between the DTV-agent 36, the storage device 26, the UMM 27, and the avatar-agents 37. The LAS 35 also connects the "set top" box 20 through a gateway 45 to an external network 42. A number of content servers 43 and Electronic Program Guide (EPG) databases 22 are connected to the external network 42.

The functions of the DTV-agent 36 include:
- the provision of a graphical user interface via a display screen 11 of the DTV 10;
- to control the functionality of the DTV 10 including interacting with the content servers 43 to select multimedia content for viewing, viewing of messages from the UMM 27, and viewing of content recorded on the electronic storage device 26; and
- to gather user selections of programs and interactions with the DTV 10, and delivers them to the avatar agents 37.

Figure 1B:
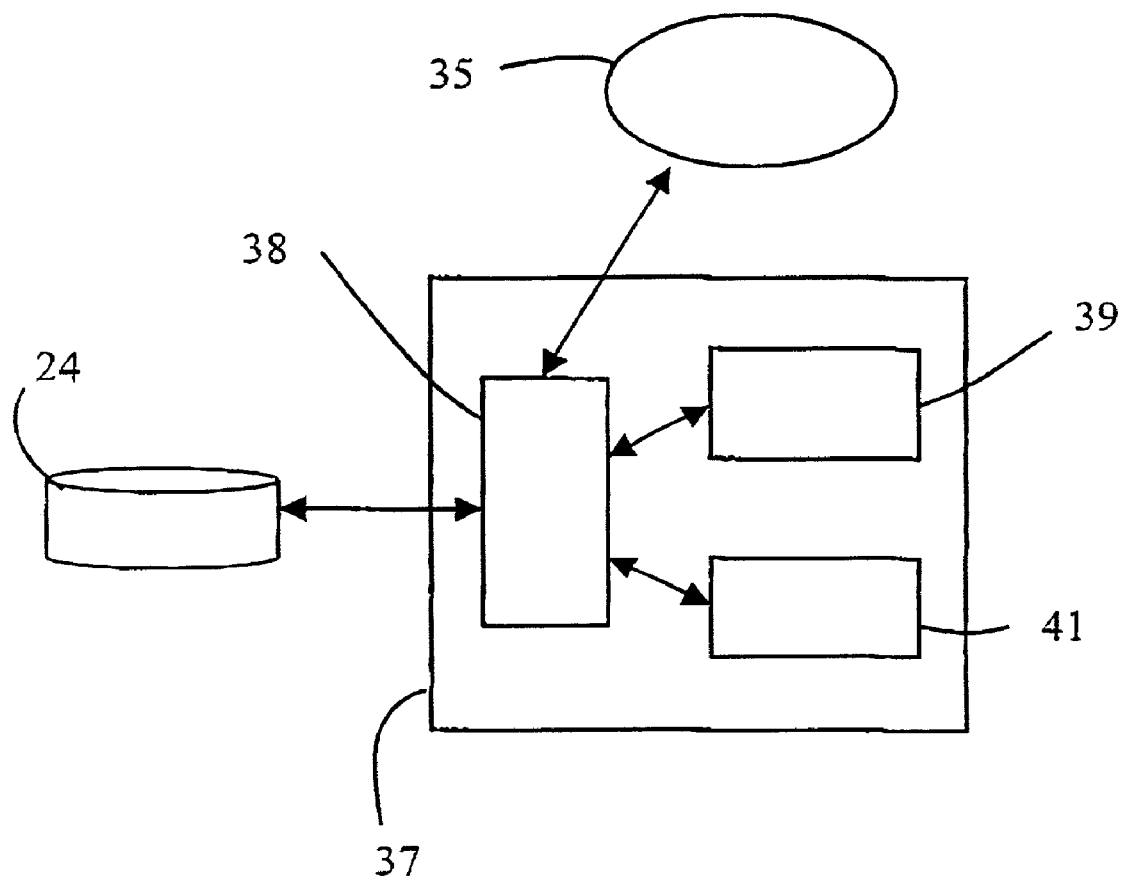
FIG. 1B is a detailed representation of an avatar agent of the system in FIG. 1A.

Each of the avatar-agents 37 is associated with a single user, and uses at least a viewer instance database 24 to store information relating to the associated user for later use by the avatar-agent 37. The term database as used herein refers to data records generally and is not meant to imply any specific data structure. As seen in FIG. 1B, each avatar-agent 37 includes an avatar manager 38 that maintains control of the particular avatar-agent 37. The avatar manager 38 is also responsible for sending messages to, and receiving messages from, the DTV-agent 36, the storage device 26 and the UMM 27 through the IAS 35. Within the avatar-agent 37, the avatar manager 38 is also responsible for interfacing with each of a learning module 39 and a planning module 41. The avatar-agent 37 may additionally include a recommendation module (not illustrated) for making recommendations to the user of available programs to watch.

Electronic messages can be sent by several different methods, which may include electronic mail (e-mail), fax, and voice-mail. The UMM 27 is a module which enables access to these electronic messages from a single receptacle. Users may access the electronic messages through the DTV 10, allowing them to retrieve those messages at any suitable time.

The UMM 27 preferably has the following features:
- processing of e-mail attachments;
- voice-mail to email: messages arrive as digital audio files that can be played over DTV speakers (not illustrated), and is converted to text format which can be viewed on the DTV display 11, printed on an attached printer (not illustrated), e-mailed to other users, forwarded to a fax machine (not illustrated) connected to the external network 42;

fax to e-mail: faxes arrive in original format and can be viewed on DTV display 11, printed on an attached printer, e-mailed to other users, forwarded to a fax machine connected to the external network 42; and e-mail to voice-mail: electronic messages are read aloud by a computer-generated voice.

The UMM 27 receives and, in conjunction with the avatar agents 37, processes incoming messages regardless of whether the user is logged on or whether the DTV 10 is turned off. For example, a detected message can be stored in appropriate digital format (audio, image, text) and then accessed upon user request.

The electronic storage device 26 is capable of recording and playing back content, This content is typically received from the content servers 43. The electronic storage device 26 may record content upon a request from the user in a usual manner The storage device 26 may further automatically record a fragment of a currently watched program while the user is busy, and played-back upon request in a small window on the DTV display 11.

The storage device 26 may incorporate the following features:
- automatic operation of primary functions: Play, Stop, Fast Forward and Rewind;
- automatic operation of secondary functions: Pause, Frame-by-frame Advance (forward and reverse), Slow Motion (forward and reverse);
- detection of conflicts between requests from other modules, such as the planning module 41, and its current status; and
- automatic search and access to record fragments by end-pointers, in order to conveniently locate a required fragment.

The content servers 43 are typically provided by content providers and contain multimedia content including movies and television programs. The available programs are listed in the EPG databases 22. Each of the content providers may maintain an associated or EPG database 22. The available programs listed in the EPG databases 22 may be linked to the corresponding multimedia content in the content servers 43 by means of a program identifier. An extract from a typical EPG database 22 is shown in FIG. 2. The EPG database 22 has a number of program entries 60, each of which may include a number of attributes 61 with values 62. The attributes 61 may include:
- EPG identifier (ID) which is a unique number per entry;
- Program ID which is unique for each program resulting in re-runs having the same Program ID;
- Category ID, for example '01' for art, '16' for drama, '50' for Movies and Series, '75' for sport etc.;
- Subcategory ID, for example, in the movies category '50', the subcategory '001' for action/adventure, '064' for comedy, '074' for crime etc;
- Title;
- Remarks, which is a general text field about the program entry;
- Keywords;
- Rating;
- EPG Channel;
- Start Day;
- Start Date;
- Start time;
- Duration; and
- Year of Make.

In use, the user switches the DTV 10 'ON' using the remote control 30. Next, the user identifies himself/herself to the DTV-agent system 21, thereby establishing a user ID. Referring to FIG. 3, this may be done by selecting an animation character 12 from a set of characters generated by the DTV-agent 36 and displayed on the display screen 11. The selection may be performed using the remote control 30.

A message is sent to the avatar agents 37, activating only the avatar-agent 37 associated with the identified user. The user may typically use the remote control 30 to view on the DTV screen 11 an electronic program guide to select a program to watch, retrieve a message from the UMM 27 or select to view content stored previously on the electronic storage device 26.

It often occurs that, while the user is viewing content from the content servers 43 on the DTV screen 11, a message for the user is received by the UMM 27 The avatar-agent 37 is notified, and displays an icon on the DTV screen 11. The user then decides whether to view the message and if so, at what size on the DTV screen 11.

Information relating to user decisions, such as the context during which the decision was made and the actual user decision, is gathered by the DTV-agent 36 and delivered to the active avatar agent 37, which stores the information in the viewer instance database 24. User decisions are stored as instances in the viewer instance database 24, with each instance representing the particular user's decision within a specified context.

In a specific implementation, two types of instances are identified, hereinafter termed BP type (Behaviour Pattern type). All instances of a specific BP type and user are preferably stored in an instance file associated with the specific BP type and the user's User ID. Given a particular user, the fields of the instance files are now described in more detail.

The first instance file corresponds with BP type 0, which is associated with UMM content display. This type of instance occurs when the user is viewing content from the content servers 43 and a message from electronic mail (e-mail), fax, or voice-mail comes in. The user typically makes a decision based on the priority of the message, as well as the nature or content being watched. The fields of the first instance file, all of which has numbers as values, are as follows:

| | |
|---|---|
| DTV_Content_Category | Category ID, available from the EPG database 22, of the content that the user was watching on the DTV 10 when interaction occurred. For example a value '16' corresponds to the category 'drama', whereas a value '75' corresponds to a category 'sport'; |
| UMM_Content_Category | category of the UMM content when interaction occurred. For example a value '32' corresponds to a UMM category 'fax', whereas a value '56' corresponds to a UMM category 'e-mail'; |
| UMM_Content_Priority | specifies the priority associated with the UMM content. A value of '34' may represent 'low priority', a value of '60' a 'medium priority', and a value of '99' a 'high priority'; |
| Day | day of week when interaction occurred, with a value '0' representing 'Sunday' etc; |

-continued

| | |
|---|---|
| Time_of_Day | a time of the day when interaction occurred, with a value '1' representing 'morning', '2' representing 'afternoon', etc; |
| Decision | decision took by the user; and |
| Frequency | =1 for instance files. |

The user's decision may be:

| | |
|---|---|
| 0 | indifferent |
| 11 | open small secondary window |
| 12 | open medium secondary window |
| 13 | open large secondary window |
| −10 | do not interrupt |

The second instance file corresponds with BP type 1, which is associated with hard disk drive (HDD) Partial Content Play Back. This type of instance occurs when the user is viewing content from the content servers 43 and the user's viewing is interrupted while the user is reading an UMM message. When the user closes the message window, the user is provided with an option to view the recorded portion. The user typically makes a decision based on the nature of the recorded content from the electronic storage device 26, the duration of the recorded content, as well as the nature of content presently being watched. The fields of the second instance file, all of which has numbers as values, are as follows:

| | |
|---|---|
| DTV_Content_Category; | |
| HDD_Content_Category | category of the recorded electronic storage device content (for example a value '50' corresponds to an electronic storage device content category 'movie and series', whereas a value '65' corresponds to an electronic storage device content category 'public affairs'; |
| Duration | specifies the duration of the content recorded (for example a value of '34' may represent 'short' recording which is <=3 minutes, a value of '51' represents 'medium' recording which is between 3 and 10 minutes, and '92' a 'long' recording which is >=10 minutes; |
| Day; | |
| Time_of_Day; | |
| Decision; | and |
| Frequency | =1 for instance files. |

Decision is the user's decision whether to resize a secondary window to a particular size and play back the recorded fragment of the HDD content. In particular, the Decision may be.

| | |
|---|---|
| 0 | indifferent |
| 11 | open small secondary window |
| 12 | open medium secondary window |
| 13 | open large secondary window |
| −10 | do not interrupt |

These instances are used by the avatar agent 37, and in particular, the learning module 39, to learning functional usage patterns and dependencies. From the functional usage patterns and dependencies, the planning module 41 of the avatar agent 37 plans and co-ordinates activities of the DTV agent 36, the electronic storage device 26 and the UMM 27.

Each instance stored in the viewer instance database 24 is associated with a set of features ($f_i$), each feature representing a unique attribute and attribute value pair. Each attribute has a number of possible values. An example of an attribute-value pair is DTV_Content_Category=16 where DTV_Content_Category is the attribute and '16' is the attribute value.

For example, a UMM content Display (BP-type=0) instance may be

DTV_Content_Category=75;
UMM_Content_Category=32;
UMM_Content_Priority=54;
Day=3;
Time_of_Day=2;
Decision=12;
Frequency=1, which may be interpreted as meaning: the user was viewing sport, a fax came in with a medium priority, it was Tuesday afternoon, and the user took the decision to open a medium secondary window. The frequency for an instance is always 1.

The learning module 39 operates to identify all generalisation patterns from a number of instances. The generalisation patterns represent shared patterns within the instances. The learning module 39 takes the instance file as input and generates a Generalisation Pattern List (GPList) which contains all the generalisation patterns. Each generalisation pattern in the GPList may be represented as follows:

([intersection], occurrence), wherein intersection indicates a pattern that is shared by different instances, and occurrence indicates the number of instances that share such an intersection. For example, from the following instances:

C1=(f1, f2, f3, f4, f7);
C2=(f1, f2, f5, f6, f7); and
C3=(f3, f5, f6, f8)

the GPList generated has three items:

([f1, f2, f7], 2);
([f3], 2); and
([f5, f6], 2)

The first GPList entry above arises from the attribute and attribute value pairs f1, f2 and f7 occurring both in instances C1 and C2. The other entries are derived in a similar manner.

Assume for example that the instance file contains the instances shown in FIGS. 9A and 9B. The GPList is then generated by the learning module 39 from the instances.

The learning module 39 additionally selects appropriate ones of the generalization patterns in the GPList, to identify behaviour patterns. Each GPList entry is examined to determine whether it provides a value in the "Decision" field, together with at least one other specific value. If so, it is regarded as a behaviour pattern and entered as an entry in the BPList. Hence, the BPList encapsulates patterns of user behaviour with respect to one function (encapsulated by the BP type) of DTV; UMM content display and HDD partial content play back.

For the above example, the BPList generated by the learning module 39 would contain the entries shown in FIGS. 10A to 10C. Entry 70 indicates that there were 16 instances where the user took the decision "open small secondary window" (Decision=11) while watching sport (DTV_Content_Category=75). The other attribute and attribute value pairs are varying and are therefore represented with a value −1, which may be interpreted as "don't care". The 16 instances are marked 71a–71p in FIGS. 9A and 9B.

A function of the planning module 41 is to, based on the context of a decision, find which particular decision is most appropriate given previous user behaviour patterns Typically, previous instances match a current state only partially. This causes some uncertainty in determining which particular decision is most appropriate. According to some patterns, it may seem that the user would prefer the decision "open small secondary window", while according to others, a "medium secondary window" decision would be preferred. Some patterns may indicate that it is better to "ask for confirmation".

Consider the decision space for decisions by the planning module 41 for UMM Content Display (BP type=0) and HDD Partial Content Play Back (BP type=1). The decisions correspond with the user decisions. The "indifferent" decision may be interpreted as "ask for confirmation", and is used by the planning module 41 when it is unable to adequately resolve the decision. This is typically the case when there is insufficient pattern in the user decisions in the particular context. Accordingly the decisions and their decision values may be:

| 0 | indifferent |
|---|---|
| 11 | open small secondary window |
| 12 | open medium secondary window |
| 13 | open large secondary window |
| −10 | do not interrupt |

A frequency of previous decisions, stored as part of a pattern in the BPList, is only a relative indication, because of the granularity of the decision space. For example, consider the following frequencies of decisions aggregated across similar situations, where similarity is judged by a number of matched attribute and attribute-value pairs between BPList entries and that of the current context:

| indifferent | 7 |
|---|---|
| open small secondary window | 4 |
| open medium secondary window | 6 |
| open large secondary window | 2 |
| open small secondary window | 2 |

In this example, the 'indifferent' decision has the highest frequency. However, overall, as the user has chosen some window (small, medium, or large) 14 times. This indicates that a window is a better option under the circumstances. The planning module 41 aim to determine that this, indeed, is a better decision, and which window, precisely, is the better decision.

A rule-based decision-making process requires the decision-making to be broken into rules and a decision tree is hard-coded in the application program. For example, one rule might specify that if a sum of frequencies for all "open window" decisions is greater than the frequency of the "indifferent" decision, then consider only "open window" decisions. Another rule might specify that, if only "open window" decisions are being considered, then choose a decision with highest frequency amongst the "open window" decisions.

The most obvious drawback of this approach is the need to re-program and re-compile the algorithm for the particular decision tree, if new decision types are introduced.

In the preferred implementation, a numerical discrete domain (NDD) for the decision space is used. This requires that:

decision types (such as window-related decisions) are represented by NDD intervals, with each interval open on the right, and a granularity representing how many digits after a decimal point is significant; and similar decisions (like window-related decisions) are assigned closer numerical values from the same numerical interval.

With a finite number of decision factors (such as window size, sound level, etc), a finite number of NDD )intervals are provided.

Consider for example the case with decision values as follows:

| 0 | indifferent |
|---|---|
| 11 | open small secondary window |
| 12 | open medium secondary window |
| 13 | open large secondary window |
| −10 | do not interrupt |

Here three decision types are provided, represented by NDD intervals:

[−10,0[ (do not interrupt);

[0,10[ (indifferent); and

[10,20[ (window-related decisions).

The notation $[\alpha,\beta[$ is used to indicate a range of values where $\alpha \leq \text{value} < \beta$, i.e. the values includes $\alpha$ but not $\beta$. All window-related decisions have very close values (10, 11 and 12), and "indifferent" decision has a distant value of 0.

Figure 4:
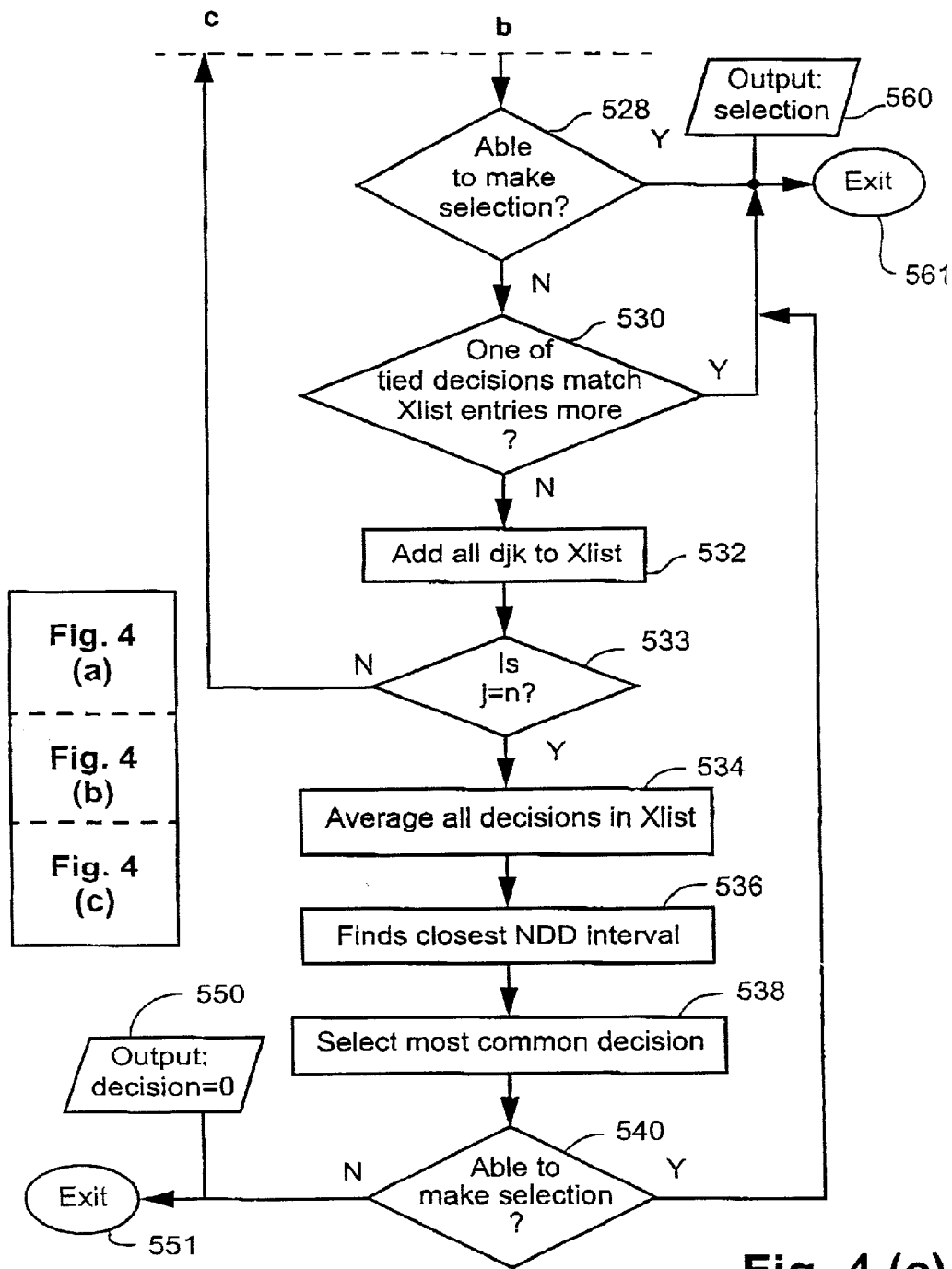
FIG. 4, consisting of parts separately labeled 4(a), 4(b) and 4(c), is a flow diagram of a method performed by a planning module of the avatar agent illustrated in FIG. 1B of determining which particular decision is most appropriate given previous suer behaviour patterns and the context of the decision.

FIG. 4 shows a schematic flow diagram of a method 500 of determining which particular decision is most appropriate given previous user behaviour patterns and the context of the decision. The method of FIG. 4 may be practiced using the conventional general-purpose computer system 100 (FIG. 8) wherein the process of FIG. 4 is implemented as software, such as an application program executing within the computer system 100. In particular, the steps may be instructions in the software that are carried out by the computer. The software may be stored in a computer readable medium. The software is loaded into the computer from the computer readable medium, and then executed by the computer. A computer readable medium having such software or computer program recorded on it is a computer program product. Inputs to the method 500 are the user behaviour pattern from the BPList created by the learning module 39, the context of the decision represented by the current attribute and attribute-value pairs, and a predefined NDD.

The method 500 starts in step 502 and receives the inputs in step 504. Step 506 compares current attribute and attribute-value pairs with that of each of the BPList records, and determines the number of matched attribute and attribute-value pairs for each pattern record.

Step 508 creates, from the given RPList, a list of contextualised records (c-list), where non-matched attribute-values are replaced with a value "−1" and the number of matched attribute and attribute-value pairs is added as weight parameter to each entry. The records of the c-list are arranged in a descending order in step 510 according to their respective weight parameters.

Step 512 constructs n clusters of c-list records, where all entries within each cluster have the same weight parameter, hence the same number of matched attribute and attribute-value pairs. Within each cluster, step 514 constructs m sub-clusters records, where each sub-cluster has the same positive relevant attribute and attribute-value pairs.

FIG. 11A shows an example c-list created from a BPList which is not illustrated. The example c-list includes 5 attributes, those being DTV Contents Category, UMM Content Category, UMM Content Priority, Day, and Time of Day. Each entry has its attribute value indicated below the attributes. The decision value corresponding to each entry and the frequency of its occurrence are also indicated. The meaning of the decision values in the example are as follows:

| 0  | indifferent                  |
|----|------------------------------|
| 11 | open small secondary window  |
| 12 | open medium secondary window |
| 13 | open large secondary window  |

The NDD intervals for the example are given as:
[−10,0[;
[0,10[; and
[10,20[.

In the example, two clusters were constructed in step 512 with the entries in cluster 1 having a weighting parameter of 4 because the entries in cluster 1 each have 4 matched attribute and attribute-value pairs. Similarly, entries in cluster 2 have a weighting parameter of 3. Cluster 1 has 5 sub-clusters, with each sub-cluster having the same positive relevant attribute and attribute-value pairs. Cluster 2 has only 2 such sub-clusters.

Referring again to FIG. 4, step 516 creates an empty decision list X. List X is simply a temporary data structure for holding most common decisions $d_{jk}$ described below. Step 518 sets a variable j equal to 0. This concludes the initialisation.

Step 519 increments variable j. Within cluster j ($1 \leq j \leq n$), step 520 retrieves for each sub-cluster k ($1 \leq k \leq m$) a most common decision $d_{jk}$ based on the frequency. Referring again to FIG. 11A, the most common decisions $d_{jk}$ based on the frequency within each sub-cluster are also indicated.

Next, all the most common decisions $d_{jk}$ within cluster j are averaged in step 522 (FIG. 4). The average of the most common decisions $d_{11}$, $d_{12}$, $d_{13}$, $d_{14}$, and $d_{15}$ within cluster 1 is 9.4.

Step 524 then finds which NDD interval out of contributing intervals is closest in terms of left bounds to the average calculated in step 522. In the example the closest contributing NDD interval in terms of left bounds to the average of 9.4 is the NDD interval [10,20[ because 9.4 is the closest to the left bound of 10.

Out of all the most common decisions $d_{jk}$ with values in the closest NDD interval, step 526 selects a decision that is most common, based on frequency, among sub-clusters. In the example, most common decisions $d_{12}$, $d_{13}$, $d_{14}$, and $d_{15}$ are within interval [10,20[, and decision $d_{13}$ with a frequency of 6 is the most common from those. Most common decision $d_{13}$ relates to decision 12 (open medium secondary window).

However, when the closest NDD interval includes a decision type having a different number of decision factors (for example, when the closest NDD interval includes a decision type having both "window-related" and "volume related" decisions and a decision type having only "window-related" decisions, as described later), a decision having a larger number of decision factors is selected. In other words, when the closest NDD interval includes decisions having different granularity of decision value, a more granular (i.e., more specific) decision is selected.

Referring again to FIG. 4, as a selection was possible, step 528 directs the method 500 to step 560 where this decision is returned.

Step 528 determines whether such a selection was possible. It may be that more than one decision has a highest frequency, which prevents step 526 from making such a selection.

FIG. 11B shows another example c-list which is similar to that shown in FIG. 11A, but the decision values and frequencies are different.

The average of the most common decisions $d_{11}$, $d_{12}$, $d_{13}$, $d_{14}$, and $d_{15}$ within cluster 1 calculated in step 522 is 6.8. The NDD interval out of contributing intervals that is closest in terms of left bounds to the average of 6.8 is the NDD interval [10,20[ because 6.8 is the closest to the left bound of 10.

The most common decisions $d_{11}$, $d_{12}$, and $d_{14}$ are within the interval [10,20[. However, both decisions $d_{11}$ and $d_{14}$ with frequencies of 7 are the most common from those, and a selection can not be made between those two decisions $d_{11}$ and $d_{14}$ because their frequencies are tied.

Referring again to FIG. 4, if step 528 determines that a selection was possible, then the method 500 returns the selection in step 560 and ends in step 561. Alternatively, the method 500 continues to step 530 where it is determined whether any of the tied decisions match the decision list X entries more, in terms of the number of occurrences in the list X. If one of the tied decisions does match the decision list X entries more, then that decision is selected and the method 500 returns the selection in step 560. Alternatively, all most common decisions $d_{jk}$ from cluster j with their corresponding frequencies are added into the decision list X in step 532. The method 500 returns to step 519 if step 533 determines that all the clusters has not yet been considered.

Returning to the example with reference to FIG. 11B, because decisions $d_{11}$ and $d_{14}$ were tied, step 528 determined that it was not possible to make a selection and method 500 continues to step 530 where it is determined whether any of the tied decisions $d_{11}$ and $d_{14}$ match the decision list X entries more, in terms of the number of occurrences in the list X. Because the list X is still empty, neither of the tied decisions $d_{11}$ and $d_{14}$ matches the decision list X entries more and step 532 adds all the most common decisions $d_{jk}$ from cluster 1 to the X list, which now contains {11, 11, 0, 12, 0 }.

Because more clusters remain, method 500 returns to step 519 where j is incremented to 2. The most common decisions $d_{21}$ and $d_{12}$ are determined in step 520 to be 11 and 13, and step 522 determines the average to be 12. The NDD interval out of contributing intervals that is closest in terms of left bounds to the average of 12 is again the NDD interval [10,20[.

Both the most common decisions $d_{21}$ and $d_{22}$ are within the interval [10,20[, but again they are tied. Because decisions $d_{11}$ and $d_{14}$ are tied, step 528 determines that it is not possible to make a selection and step 530 determines whether ally of the tied decisions $d_{21}$ and $d_{22}$ match the decision list X entries, which contains {11, 11, 0, 12, 0}, more. Decision $d_{21}$, which relates to decision value 11, appears twice in the list X, whereas decision $d_{22}$, which relates to decision value 13, does not appear in the list X. Decision 11 is therefore selected.

After processing all the clusters and a selection still has not been made, then step 534 averages all the decisions on the list X. Step 536 then finds which NDD interval out of contributing intervals is closest in terms of left bounds to the average calculated in step 534. Out of the decisions in the list X with values in the closest NDD interval, step 538 selects a decision that is most common, based on frequency. Step 540 determines whether such a selection was possible, and if so, then the method 500 returns the selection in step 560. Alternatively, a decision=0 (indifferent) is returned in step 550.

Consider another example having both "window-related" and "volume-related" decisions. The decision values are assigned as follows:

| | |
|---|---|
| 0 | indifferent |
| 11 | open small secondary window |
| 11.1 | open small secondary window and reduce volume |
| 11.2 | open small secondary window and mute volume |
| 12 | open medium secondary window |
| 12.1 | open medium secondary window and reduce volume |
| 12.2 | open medium secondary window and mute volume |
| 13 | open large sceondary window |
| 13.1 | open large secondary window and reduce volume |
| 13.2 | open large secondary window and mute volume |
| 21 | open full-screen window |
| 21.1 | open full-screen window and reduce volume |
| 21.2 | open full-screen window and mute volume |
| −10 | do not interrupt |

From the above it can be seen that secondary window decision types are considered similar, and the same secondary sized window with varying volume are assigned even closer numerical values as they are considered very similar.

The NDD intervals are given as:

[−10,0[;

[0,10[;

[11,12[;

[12,13[;

[13,14[; and

[21,22[.

Also consider the following most common decisions $d_{jk}$ from their respective sub-clusters and within the same cluster, their interpretation and frequency:

| | | | |
|---|---|---|---|
| 0 | indifferent | 7 | (sub-cluster 1) |
| 11.1 | open small secondary window and reduce volume | 4 | (sub-cluster 2) |
| 12 | open medium secondary window | 6 | (sub-cluster 3) |
| 13.2 | open large secondary window and mute volume | 2 | (sub-cluster 4) |
| 21 | open full-screen window | 2 | (sub-cluster 5) |

Starting again in step 522, all the most common decisions $d_{jk}$ within this cluster are averaged to provide an average value of 11.46. Step 524 then finds which NDD interval out of contributing intervals is closest in terms of left bounds to the average value of 11.46. The closest contributing interval is interval [11,12[. Step 526 then selects the decision that is most common out of those within interval [11,12[. There is only one decision in this interval, namely decision 11.1 (open small secondary window and reduce volume). As a selection was possible, step 528 directs the method 500 to step 560 where this decision is returned.

Further consider the following most common decisions from their respective sub-clusters and within the same cluster, their interpretation and frequency:

| | | | |
|---|---|---|---|
| 0 | ask for confirmation | 7 | (sub-cluster 1) |
| 11 | open small secondary window | 6 | (sub-cluster 2) |
| 11.1 | open small secondary window and reduce volume | 4 | (sub-cluster 3) |
| 13.2 | open large secondary window and mute volume | 2 | (sub-cluster 4) |
| 21 | open full-screen window | 2 | (sub-cluster 5) |

Starting again in step 522, all the most common decisions $d_{jk}$ within this cluster are averaged to provide an average value of 11.26. Step 524 then finds which NDD interval out of contributing intervals is closest in terms of left bounds to the average value of 11.26. The closest contributing interval is interval [11,12[. Step 526 then selects the decision that is most common out of those within interval [11,12[. There are two decisions in this interval, namely decision 11 (open small secondary) and decision 11.1 (open small secondary window and reduce volume), and this results in "open small secondary window and reduce volume" decision. Note that this decision was preferred to the "open small secondary window" decision despite being less frequent. It was, however, more specific.

As a selection was possible, step 528 directs the method 500 to step 560 where this decision is returned.

Operations within the planning module 41 are further described by way of an example A user watches a soccer game on the DTV. It is Tuesday afternoon, A high-priority e-mail message addressed to the user arrives, setting the following variables:

UMM.Status=NewMessage;

UMM_Content_Category=56 (e-mail); and

UMM_Content_Priority=99 (high priority).

The UMM 27 becomes aware of the arrival of this new message by periodically (every k minutes) checking the variable UMM.Status. Because the variable UMM.Status now have a value 'NewMessage', the UMM 27 notifies the avatar-agent 37 of the corresponding user of the value of the variables UMM_Content_Category and UMM_Content_Priority.

The planning module 41 now determines, by using method 500 described above, which particular decision is most appropriate given previous user behaviour patterns and the context of the decision. The module 41 retrieves the BPList generated by the learning module 39 from the instance file corresponding with BP type 0, the NDD which is predetermined, and request context information from the DTV agent 36. It then waits for a response The DTV agent 36 responds with the following variables:

DTV.Status=ON;

DTV_Content_Category=75 (sport);

Day=2 (Tuesday); and

Time_of_Day=2 (Afternoon).

If the decision is not to interrupt the user, no further action is taken. If the decision is 'indifferent', then the avatar agent 37 requests that DTV agent 36 obtains user clarification. It then waits for a user response. When the DTV agent 36 receives user confirmation, it notifies the avatar agent 37 about the user decision.

If the decision is one of the secondary window type decisions, the planning module 41 requests that DTV agent 36 arranges a secondary window to display the UMM Content This is a direct action. It also requests the electronic storage device 26 to start recording the current DTV content ie. the soccer game. This is a ramification.

The DTV agent 36 resizes the soccer game window and opens an e-mail window.

When the avatar agent 36 receives user confirmation from the DTV agent 36, a new instance is created. Alternatively, if the action taken based on the decision by the planning module 41, ie. to open a secondary window automatically, and this decision is not overwritten by the user by closing the window immediately, a new instance is created with this decision. The learning module 39 is notified to learn a new GPList and to create a new BPList, from the instances which now include this newly created instance.

After a while, the user finishes reading the e-mail message and selects a close e-mail option. The DTV agent 36 clears the e-mail window, and notifies the avatar agent 36. The avatar agent 36 notifies the electronic storage device 26 to stop recording.

The planning module 41 continues by determining, again by using method 500 described above, which particular decision for displaying tie recorded fragment is most appropriate given previous user behaviour patterns and the context of the decision. It retrieves the BPList generated by the learning module 39 from the instance file corresponding with BP type 1, the NDD which is predetermined, and request context information from the DTV agent 36. For the particular example, the context is as follows:

DTV_Content_Category=75;

HDD_Content_Category=75;

Duration=34 (short recording which is<=3 minutes);

Day=2; and

Time_of_Day=2.

If the decision is not to interrupt the user, no further action is taken. If the decision is 'indifferent', then the avatar agent 37 requests that DTV agent 36 obtains user clarification. It then waits for a user response. When the DTV agent 36 receives user confirmation, it notifies the avatar agent 37 about the user decision.

If the decision is one of the secondary window type decisions, the planning module 41 requests that DTV agent 36 arranges a secondary window to display the UMM Content.

The DTV agent 36 resizes the current DTV content, which is still the soccer game in the example, and opens a secondary window in which the recorder fragment is displayed.

When the avatar agent 36 receives user confirmation from the DTV agent 36, a new instance is created. Alteniatively, if the action taken based on the decision by the planning module 41 and this decision is not overwritten by the user by closing the window immediately, a new instance is created with this decision. The learning module 39 is notified to learn a new GPList and to create a new BPList.

The different tasks preformed in the system 50 as described in the above example may be categorised as follows:

periodic—performed repeatedly at specific intervals, in other words, rescheduled upon execution for subsequent re-execution according to its period, such as the task performed by the UMM 27 for checking the variable UMM.Status every k minutes;

triggered—performed (sometimes repeatedly) in response to external events, such as the task performed by the avatar agent 36 when receiving a notification from the UMM 27 that a message has arrived. This notification also includes values for the variables UMM_Content_Category and UMM_Content_Priority, and knowledge-producing—performed for sensing or information gathering, such as the task performed by the avatar agent 36 when receiving a message from the DTV agent 36 which includes information on the current context. This task produces a decision on the most appropriate decision given previous user behaviour patterns and the context of the decision.

These categories are not mutually exclusive. For example, a knowledge-producing task may be triggered in response to external events.

In a preferred implementation, these tasks are implemented by means of a task network. Every task in the task network can flexibly control the flow of information by either triggering other (sub-) tasks, messaging to them, or both The control flow in a contextual task network is derived by a (sub-) plan generated by each task in response to a particular state, contextual user behaviour patterns and functional dependencies. The control flow may change dynamically if user behaviour patterns are updated by the learning module 39.

Figure 5:
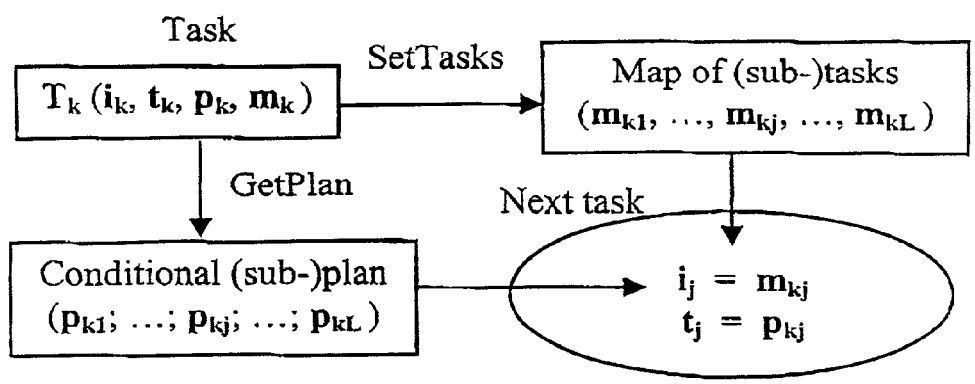
FIG. 5 is a schematic diagram of a task within a task network.

Referring to FIG. 5, a task $T_k$ is represented by its id $i_k$, type of invocation (trigger or message) $t_k$, a conditional (sub-) plan $p_k$, and a map of (sub-) tasks $m_k$. When the task $T_k$ is invoked by a trigger, it reads and interprets incoming data, activates the (sub-) plan $p_k$, and executes it. When the task $T_k$ is invoked with a message, it just reads and interprets the incoming data. The (sub-) plan $p_k$ is represented as a vector of plan nodes $p_{kj}$. Activation of the (sub-) plan $p_k$ results in construction of a sequence of plan nodes $p_{kj}$, where each node $p_{kj}$ is mapped to other (sub-) tasks $i_j$, represented by the map $m_{kj}$. In other words, each plan node determines which (sub-) task should be invoked at the moment and how (by a trigger or with a message).

Figure 6:
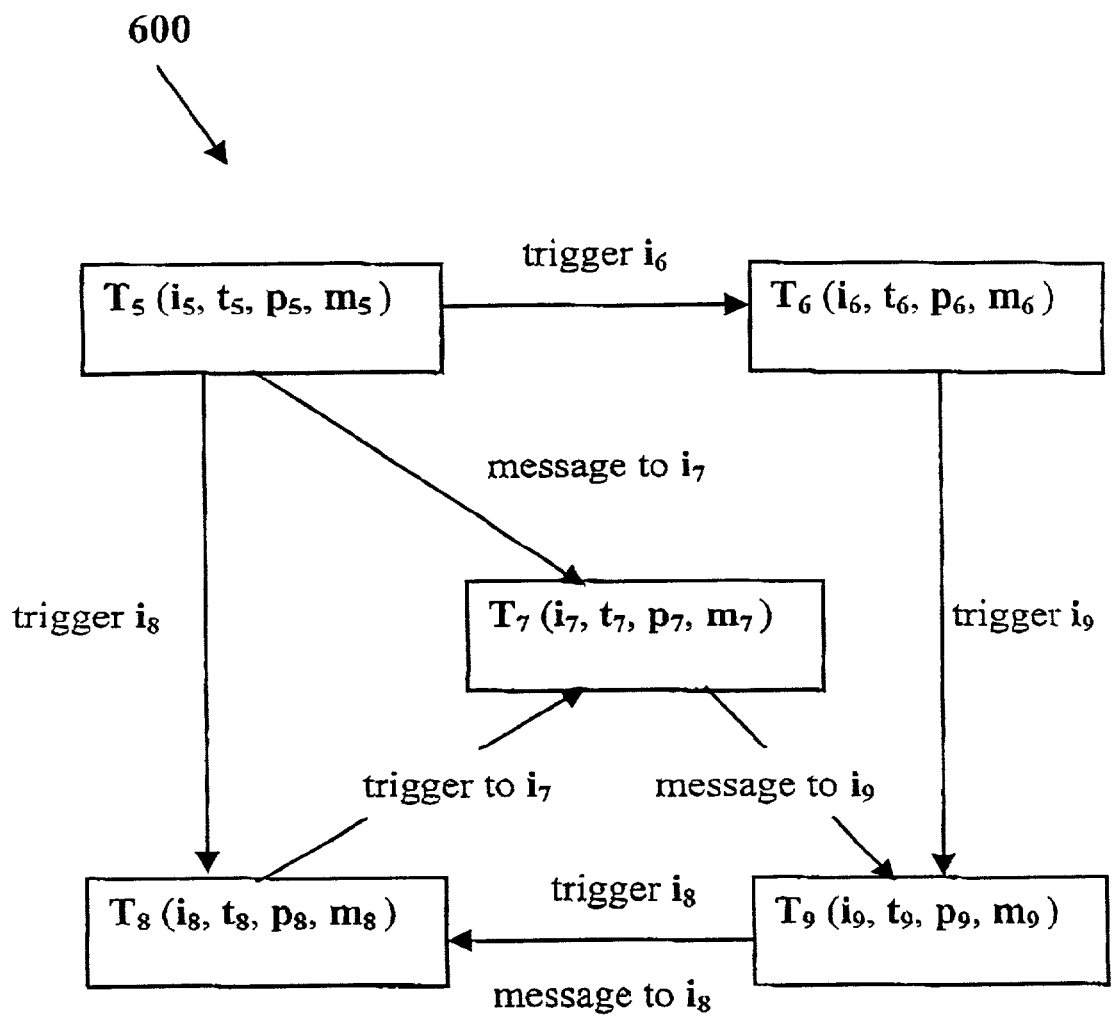
FIG. 6 is a schematic diagram of an example contextual task network.

FIG. 6 is a diagram exemplifying this process across a task network 600. In this example, the task $T_5$ has a conditional (sub-) plan with control flow to either (sub-) task $T_6$ or (sub-) task $T_8$, and information flow to (sub-) task $T_7$.

Sometimes, in order to trigger or pass information to a (sub-) task $T_1$, a plan node needs to determine contextual user preferences, such as described with reference to FIG. 4. For example, task $T_9$ could be a (sub-) task responsible for such contextualisation. Before task $T_6$ can trigger the (sub-) task $T_8$, the latest user behaviour pattern should be analysed, and therefore, the (sub-) task $T_9$ is triggered first.

Let it be assumed that task $T_7$ uses the learning algorithm performed in the learning module 39 and updates the user behaviour pattern BPList when a message $i_7$ is received from task $T_8$. This user behaviour pattern dynamically changes and is different the next time tasks $T_9$ and $T_8$ are triggered. Consequently, a message fromn $T_9$ to $T_8$ may dynamically change, given new context.

Typically, a particular scenario may develop when a subset of contextual task network links is activated Given a current state of the DTV System 50 and current user behaviour patterns, a trajectory is planned by the planning module 41, and a scenario develops during run-time. In other words, all potential combinations of task flows in a network cover a variety of possible scenaria.

However, any given task network, whether contextual or not, specifies all possible trajectories in advance. Therefore, there is a limit on a number of potential scenaria supported by a given task network Such a number may be sufficiently significant given the combinatorial nature of task networks, but nevertheless, it limits the flexibility of such contextual task networks.

The flexibility of such contextual task networks may be enhanced by introduction of a scenario-independent template for task networks (SIT-TN). This feature allows a system designer to easily set up new scenaria, without affecting other modules and/or tasks.

As was noted above, a task network specifies all possible trajectories in advance, limiting a number of potential scenaria Therefore, if a new scenario needs to be introduced, the task network must be updated, re-programmed and re-compiled.

subject is set according to the BP type. As the BP type is 1 in the case of fragments of content stored on the storage device 26, the variable subject is given a value HDDPartialContentPlayback. In the three code lines that follow, a subject_list is prepared which contains all the variables of the current context, which are to be used by another task to determined an appropriate decision. Finally, a notification is sent to a task OnContentQuery in the DTV agent 36, acting as a trigger for that task and passing the value of the variable source to that task.

By setting the variable subject and subject_list, information is made available for the task, named OnDTVContentResponse that determines the most appropriate decision. In the task network environment, this is a message.

In the alternative, when the response received is equal to 0, then the HDD_Content_Category is not valid and the task proceeds to monitor the user behaviour patterns.

The same task may be written in a SIT-TN as follows:

| Task Name | Task Link | Condition | Link Type | Arguments |
|---|---|---|---|---|
| OnHDDResponse | DTV::OnContentQuery | response > 0 | TRIGGER | source = avatar |
| OnHDDResponse | OnDTVContentResponse | response > 0 | MESSAGE | subject = HDDPartialContent Playback subject_list = (response, duration) |
| OnHDDResponse | MatchEPGUserProfile | response == 0 | MESSAGE | monitoring = true |
| OnHDDResponse | OnRecordedRecommendation Request | response == 0 | MESSAGE | recorded_epg_id = epg_id |

In a preferred implementation, the SIT-TN is structured as follows:

| Task Name | Task Link | Condition | Link Type | Arguments |
|---|---|---|---|---|

Here Task Name and Task Link correspond to task ids, the former being a current task, the latter being an invokable sub-task, Condition is a Boolean expression capturing a pre-requisite for the invocation, Link Type is a type of the invokation (either TRIGGER or MESSAGE) between current task and sub-task, and Arguments is a list of parameters passed to the sub-task.

Consider for example an example task with task name OnHDDResponse performed by the planning module 41. This task is triggered when the storage device 26 replies with the value of HDD_Content_Category in response to an earlier request from the planning module 41 for this information. Code for such a task may be as follows.

If response>0 then
subject=HDDPartialContentPlayback
clear(subject_list)
add(response, subject_list)
NOTIFY (DTV, OnContentQuery, source=avatar)
Else if response=0 then
Monitoring=true
Add(epg_id, record_list)

Hence, the task OnHDDResponse is triggered by the reply that includes the variable response, which is the HDD_Content_Category. If a valid HDD_Content_Category was received, the value is positive. The variable Which may be interpreted as follows:

For the task OnHDDResponse, when a condition response>0 is received, a trigger is sent to task OnContentQuery in the DTV agent 36, passing argument source=avatar, Also, a message is sent to the task OnDTVContentResponse, passing values for variables subject and subject_list.

However, is a condition response=0 is received, a message is sent to the task MatchEPGUserProfile containing the value of variable monitoring, and a message is sent to the task OnRecordedRecommendationRequest which contains a value for recorded_epg_id.

There are, in general, a few records with the same Task Name in a SIT-TN representation, where each individual record specifies a particular link, cotresponding to a plan node. The example task OnHDDResponse has 4 links.

The operation of the learning module 39 will now be described in more detail. The processes performed by the learning module 39 described in relation to FIGS. 7A to 7F may be practiced using the conventional general-purpose computer system 100 (FIG. 8) wherein the processes are implemented as software, such as an application program executing within the computer system 100.

Figure 7A:
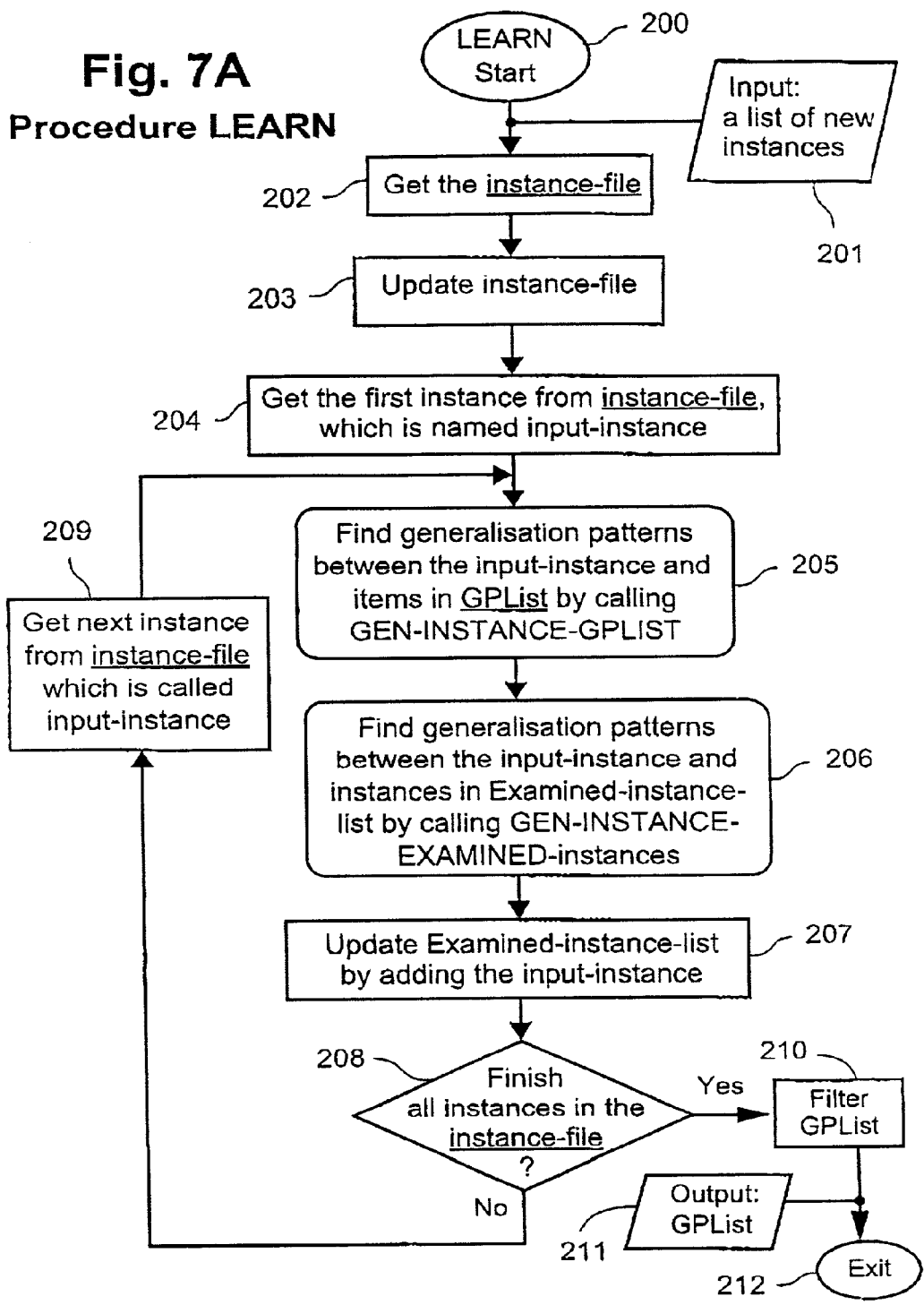
FIGS. 7A to 7F, of which 7B consists of separately labeled parts 7B(a) and 7B(b), and 7C consists of separately labeled parts 7C(a) and 7C(b), are flow diagrams of a method performed by a learning module of the avatar agent illustrated in FIG. 1A, to learn contextual behaviour patterns from decisions made by the user.

A procedure LEARN for performing the core function in the learning module 39 is shown in FIG. 7A. Four data structures are used in the procedure namely, the Instance-file which contains a number of instances (Cj), the GPList which keeps all generalisation patterns, the BPList which keeps all behaviour patterns, and an Examined-instance-list which contains instances that are already processed. Initially, upon initiation of the procedure LEARN, the GPList, BPList and the Examined-instance-list are empty.

The procedure LEARN starts in step 200 by first obtaining a list of new instances in step 201 based on a specific BP type, and the Instance-file for that BP type from the viewer instance 24 database in step 202. Step 203 updates the Instance-file by adding the new instances.

Intersections for each instance of the Instance-file with the current GPList is obtained in the remaining steps 204 to 211. A first entry from the Instance-file is taken in step 204 and used as ail input instance when calling sub-routine GEN-INSTANCE-GPList in step 205. Sub-routine GEN-INSTANCE-GPList finds the generalization patterns between the input-instance and items in the GPList and starts at step 220 in FIG. 7B. Sub-routing GEN-INSTANCE-EXAMINED-INSTANCES is called in step 206 for finding generalization patterns between the input-instance and the instances in the Examined-instance-list, Sub-routing GEN-INSTANCE-EXAMINED-INSTANCES starts at step 310 in FIG. 7E. In step 207, the input-instance is added to the Examined-instance-list. Instances (Cj) are therefore progressively moved from the Instance file to the Examined-instance-list until the Instance-file is empty. Step 208 determines whether Instance-file has any more entries. If there are any remaining entries in the Instance-file, the procedure LEARN proceeds to step 209 where the next entry from Instance-file is used as input-instance and the procedure LEARN continues to step 205.

After step 208 determines that the Instance-file is empty, step 210 filters the generalization patterns in the GPList to create a subset. Each GPList entry is examined to determine whether it provides a value in the "Decision" field, together with at least one other specific value. If so, it is regarded as a behaviour pattern and entered as an entry in the BPList. The BPList is the behaviour patterns and is produced as an output in step 211. Procedure LEARN ends in step 212.

Figure 7B:
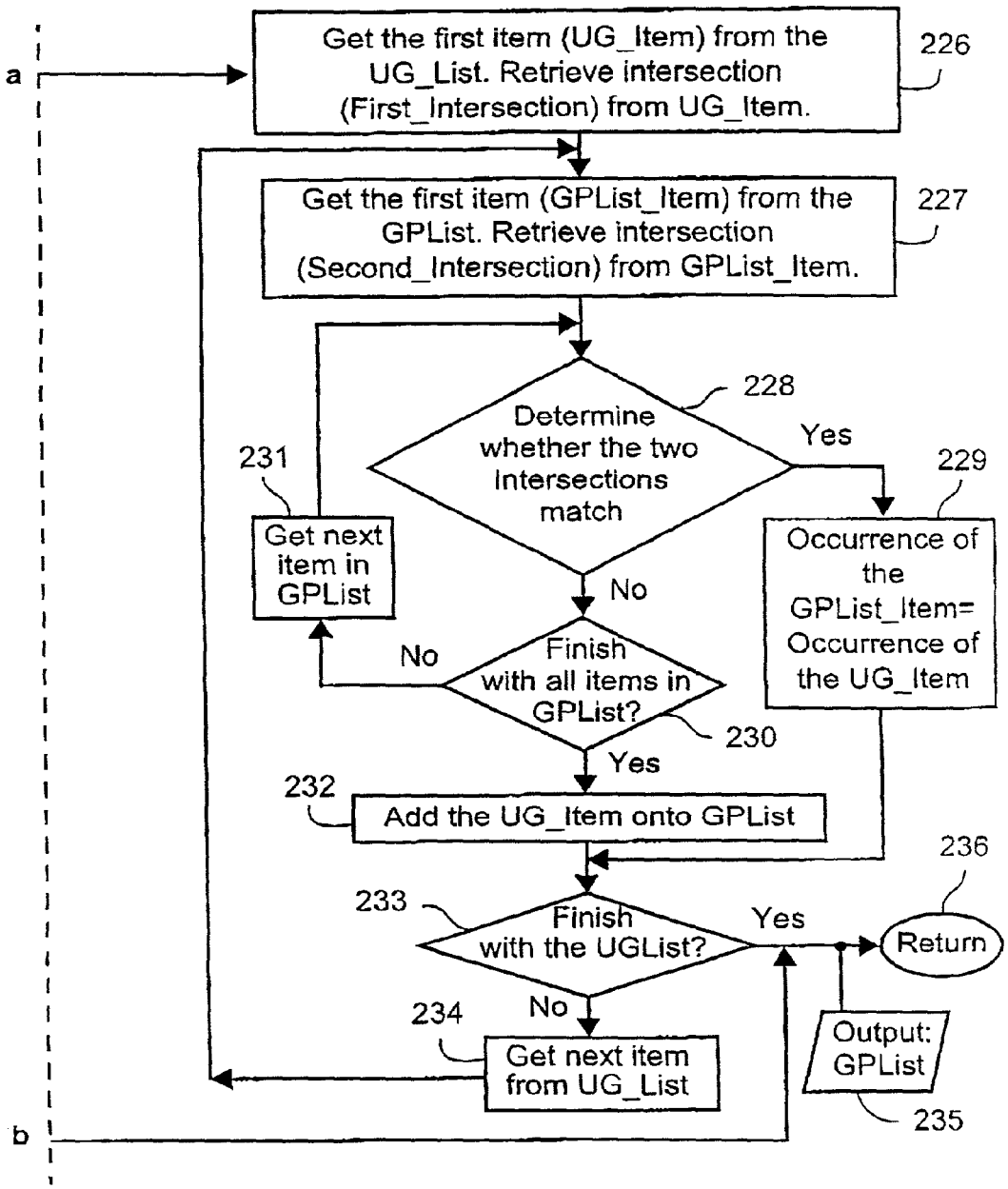

Referring to FIG. 7B the sub-routine GEN-INSTANCE-GPLIST is to find all generalization patterns between the input-instance and all items in the GPList. It further updates the GPList with all new generalization patterns between the input-instance and the current GPList.

GEN-INSTANCE-GPLIST starts in step 220 and receives the input instance and the current GPList as inputs in step 221. It is determined in step 222 whether the current GPList is still empty. If the current GPList is empty, then no generalization patterns between the input-instance and the GPList can exist and the sub-routine returns in step 236.

With items in the GPList, the sub-routine continues to step 223 wherein all generalization patterns between the input-instance and all items in the GPList are found by calling sub-routine G_List_GEN. The generalization patterns are pat in a G_List, which contains potential generalization patterns between the input instance and the GPList. The subroutine G_List_GEN starts at step 240 in FIG. 7C.

It is determined in step 224 whether the G_List is empty, If the G_List is empty, then no generalization patterns between the input-instance and the GPList was found by sub-routine G_List_GEN and the sub-routine GEN-INSTANCE-GPLIST returns in step 236.

With items in the G_List, the sub-routine GEN-INSTANCE-GPLIST continues to step 225 where subroutine UG_List_GEN is called. Subroutine UG_List_GEN starts at step 260 in FIG. 7D, and forms a unique generalisation pattern list, UG_List, from the G_List.

A first item from the UG_List, UG_Item, is retrieved and the intersection, First_Intersection, from the UG_Item is extracted in step 226. A first item from the GPList, GPList_Item, is retrieved and the intersection, Second_Intersection, from the GPList_Item is extracted in step 227.

Step 228 determines whether First_Intersection and Second_Intersection match. If step 228 finds that First_Intersection and Second_Intersection match, the occurrence of GPList_Item is made equal to that of UG_Item in step 229. The sub-routine continues to step 233.

If step 228 finds that First_Intersection and Second_Intersection do not match, then step 230 determines whether all items of the GPList have been considered. If items remain, the next item in the GPList is retrieved with it's intersection as Second_Intersection in step 231, before step 228 again determines whether First_Intersection and Second_Intersection match. If step 230 determined that all items in the GPList have been considered, then the UG_Item is added to the GPList in step 232 and the sub-routine continues to step 233.

If step 233 determines that all items in the UG_List have not been considered, then the next item in the UG_List is retrieved with it's intersection as First_Intersection in step 234 and followed by step 227. Alternatively, if step 233 determines that all items in the UG_List have been considered, the sub-routine GEN-INSTANCE-GPLIST outputs the GPList in step 235 and returns in step 236.

Figure 7C:
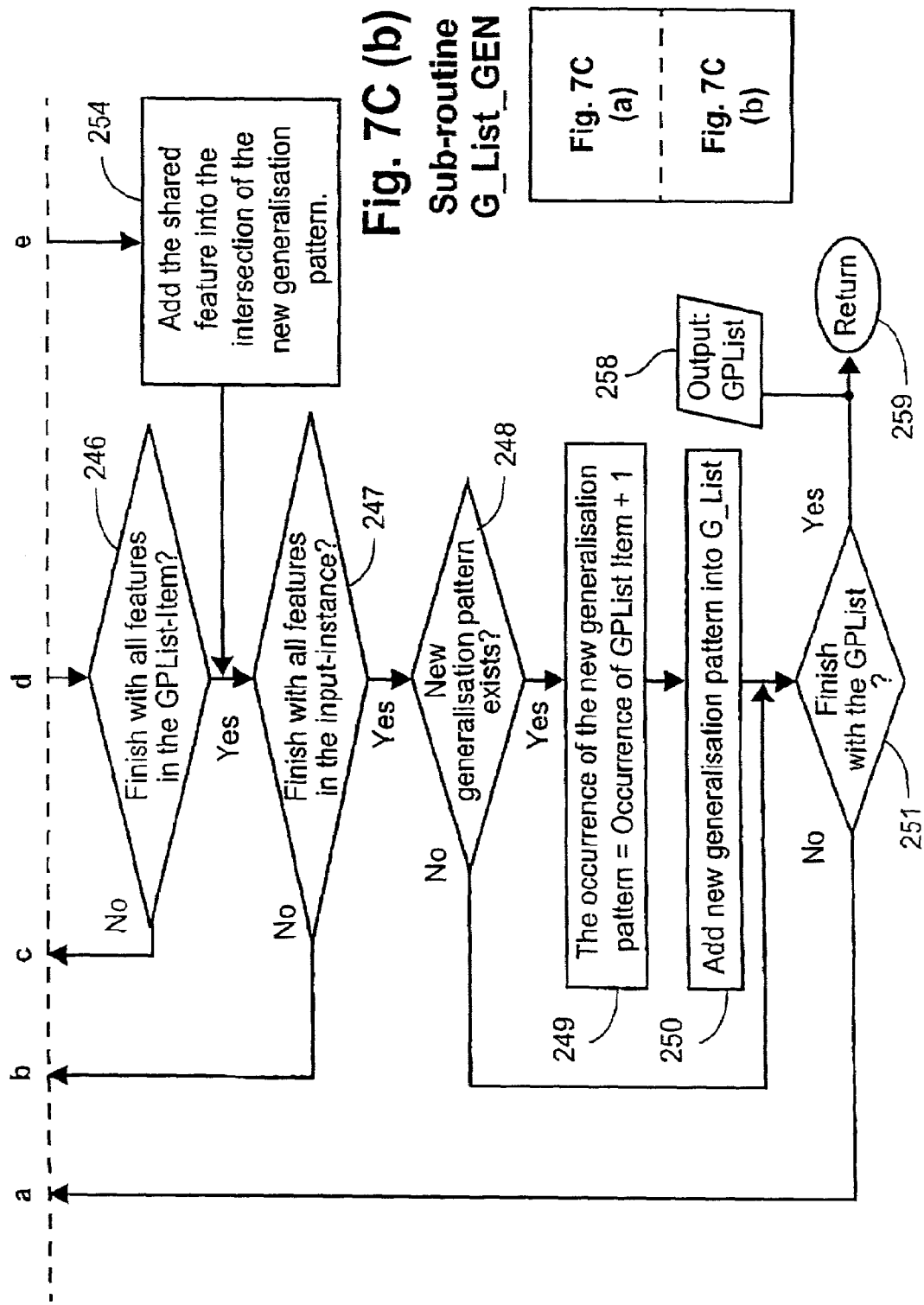

Referring to FIG. 7C, sub-routine G_List_GEN is described, which determines all generalisation patterns between the input-instance with all items in the GPList, Starting at step 240 , it receives as inputs the input-instance and the GPList. The inputs are obtained in step 241. A first generalisation pattern, GPList_Item is obtained from the GPList in step 242, a first feature from the input instance is retrieved in step 243 and a first feature from the intersection part of the GPList_Item is retrieved in step 244. Step 245 determines whether the retrieved feature from the input-instance is the same as the retrieved feature from the GPList_Item. If no match is found in step 245, step 246 determines whether all features from the GPList_Item has been dealt with. With more features in the GPList_Item remaining, step 255 retrieves a next feature from the GPList_Item and continues to step 245. If all the features in the GPList_Item were considered, the sub-routine continues to step 247.

If step 245 responds in the affirmative, step 252 determines whether a new generalization pattern has been created and create one in step 253 if required, or if it was already done, proceeds to step 254, where the shared feature is added to the new generalization pattern. The sub-routine continues to step 247 where it is determined whether all features from the input-instance have been dealt with. If there are remaining features in the input-instance, step 256 retrieves the next feature from the input-instance.

If step 247 determined that all the features from the input-instance were considered, step 248 determines whether a new generalisation pattern was created in step 252. If the generalisation pattern already existed in the intersection parts of the GPList, the sub-routine continues to step 249 where the occurrence of the new generalisation pattern is given a value of the GPList Item that has the same intersection plus 1. In step 250 the new generalisation pattern is added to the G_List.

If step 248 determined that the new generalisation pattern does not already exist in the GPList, then the sub-routine continues to step 251.

Step 251 determines whether all items from the GPList have been considered. If an item remains in the GPList, the sub-routine continues to step 257 where the next item in the GPList is retrieved and step 243 is executed. Alternatively, with all items in the GPList considered, the sub-routine G_List_GEN returns in step 259 after producing the new G_List as output in step 258.

Figure 7D:
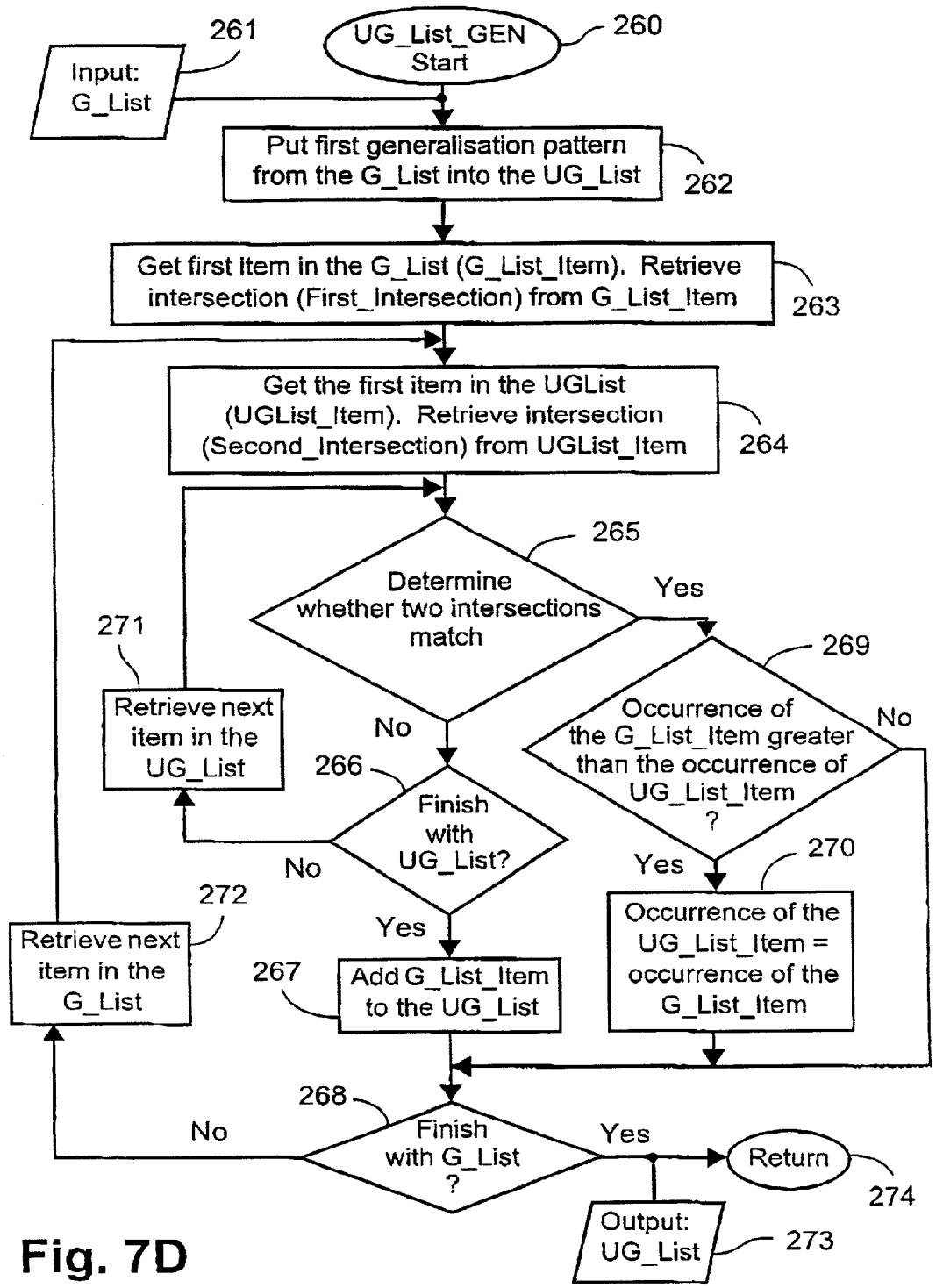

Referring to FIG. 7D, a sub-routine UG_List_GEN is showvn which forms a unique generalisation pattern list, UG_List. Starting in step 260, the sub-routine receives in step 261 the G_List as input. In step 262 the first generalisation pattern is copied from the G_List into the UG_List. A first item from the G_List, G_List_Item, is retrieved and the intersection, First_Intersection, from the G_List_Item is retrieved in step 263. A first item from the UGList, UGList_Item, is retrieved and the intersection, Second_Intersection, from the UGList_Item is retrieved in step 264.

Step 265 determines whether First_Intersection and Second_Intersection match. If First_Intersection and Second_Intersection match, the higher occurrence of the two items, G_List_item and UG_List_Item, is determined and saved as the occurrence of UG_List_Item in steps 269 and 270. The sub-routine continues to step 268.

If First_Intersection and Second_Intersection do not match, step 266 determines whether all items of the UG_List have been considered. If items remain, the next item in the UG_List is retrieved with its intersection as Second_Intersection in step 271, before step 265 again determines whether First_Intersection and Second_Intersection match. If step 266 determined that all items in the UG_List have been considered, then the G_List_Item is added to the UG_List in step 267 and the sub-routine continues to step 268.

If step 268 determines that all items in the G_List have not been considered, then the next item in the G_List is retrieved with it's intersection as First_Intersection in step 263 and followed by step 264. Alternatively, if step 268 determines that all items in the G_List have been considered, the sub-routine UG_LIST_GEN outputs the UG_List in step 273 and returns in step 274.

Figure 7E:
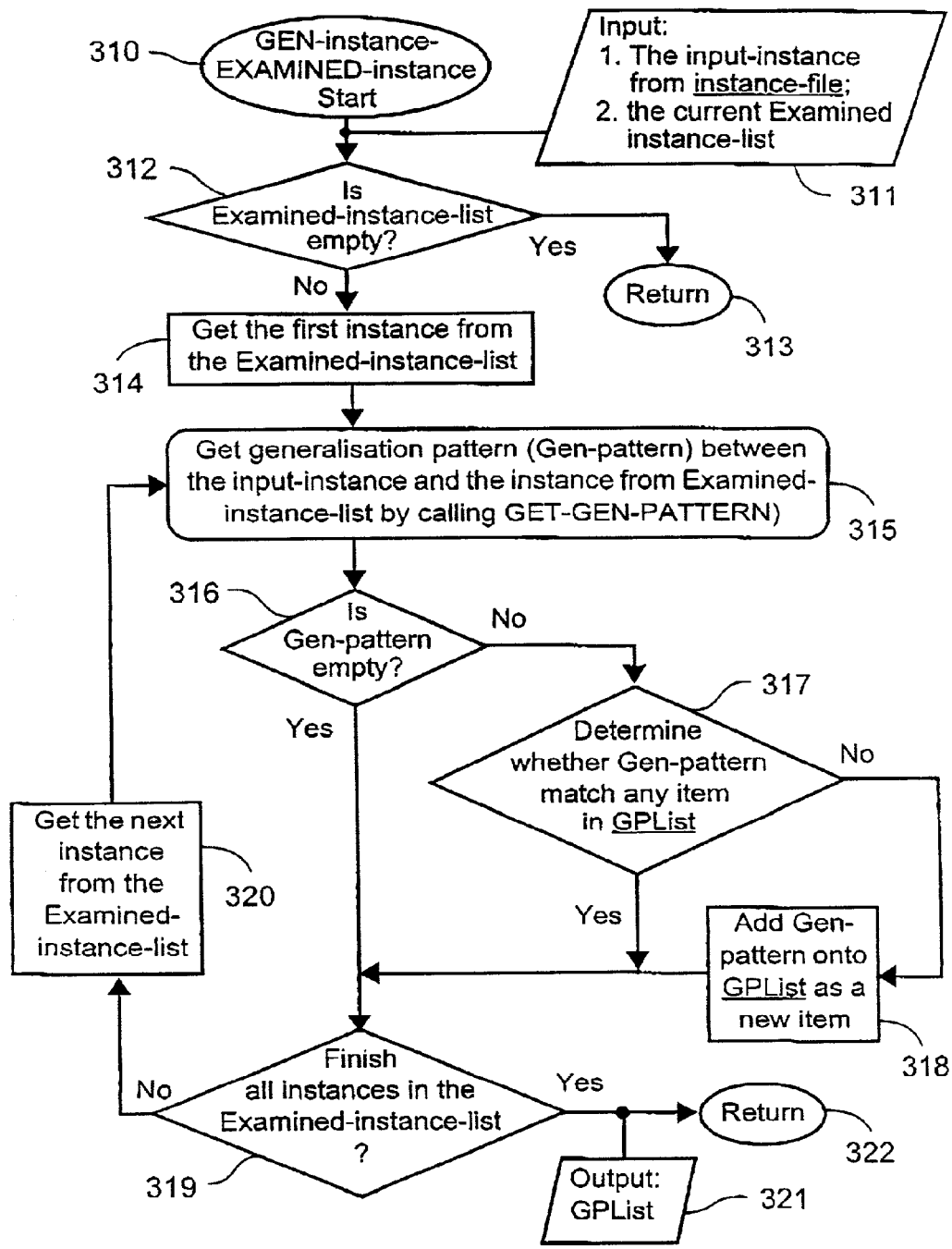

Sub-routine GEN-INSTANCE-EXAMINED-INSTANCES starts in step 310 in FIG. 7E. This sub-routine finds generalisation patterns between the Examined-case-list, input-instance from Instance-file and instances in the Examined-instance-list, which it receives as inputs in step 311. Step 312 determines whether the Examined-instance-list is empty and returns in step 313 if this is affirmative. If the Examined-instance-list has items, the sub-routine continues to step 314 where the first Examined-instance-list from the Examined-instance-list is retrieved. Step 315 calls subroutine GET-GEN-PATTERN to calculate a generalisation pattern, Gen-pattern, between the input-instance and the instance from the Examined-instance-list. Subroutine GET-GEN-PATTERN starts at step 330 in FIG. 7F.

Step 316 determines whether a Gen-pattern has been found. If a Gen-pattern has been found, the sub-routine determines in step 317 whether the Gen-pattern match any item in the GPList. If the Gen-pattern does not match any item in the GPList, then step 318 adds Gen-pattern to GPList as a new item and continues to step 319. If step 317 find that the Gen-pattern match an item in the GPList, then the sub-routine continues to step 319 where it is determined whether all instances in the Examined-instance-list bave been considered.

If step 319 determines that instances in the Examined-instance-list remain to been considered, then step 320 retrieves the next instance from the Examined-instance-list and continues to step 315. Alternatively, step 321 outputs the GPList and the sub-routine GEN-INSTANCE-EXAMINED-INSTANCES returns in step 322.

Figure 7F:
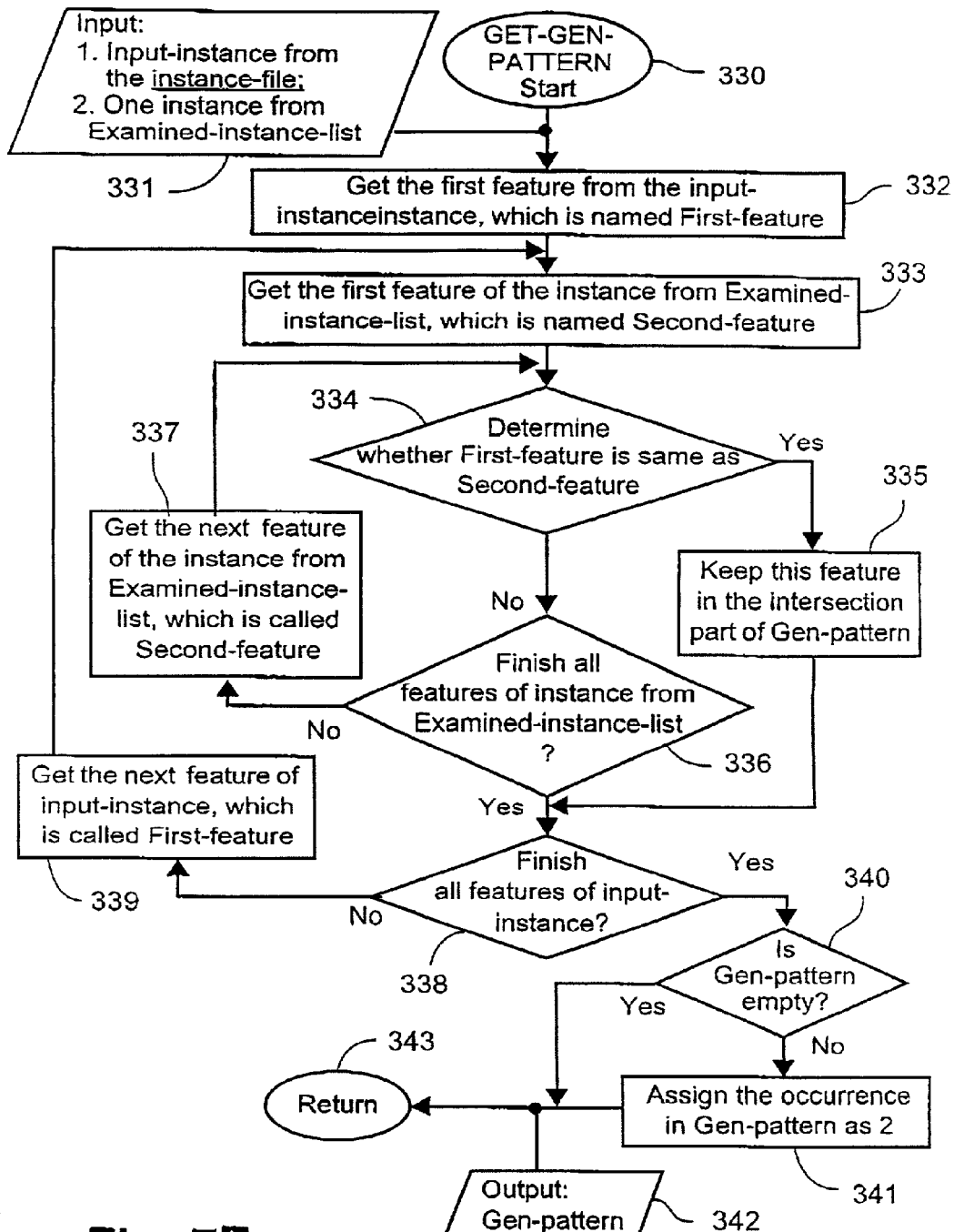

Referring to FIG. 7F, wherein sub-routine GET-GEN-PATTERN for identifying a generalization pattern, Gen-pattern, between an input-instance from the Instance-file and one instance from the Examined-instance-list, is shown. The sub-routine starts in step 330 by obtaining input-instance and a instance from the Examined-instance-list as inputs in step 331. It takes these two instances as input and compares their features. If some features are shared by the two instances, then these shared features will be included in the intersection part of Gen-pattern. The occurrence in Gen-pattern will be 2. Otherwise, if no features are shared between the instances, an empty Gen-pattern will be produced as output.

Step 332 retrieves the first feature from the input-instance, named First-feature, followed by step 333 where the first feature from the instance from the Examined-instance-list, named Second-feature, is retrieved. Step 334 determines whether First-feature is the same as Second-feature. If they are the same, then step 335 would keep this feature in the intersection part of Gen-pattern and proceeds to step 338. If step 334 determined that the features were not the same, then step 336 determines whether all the features of the instance from the Examined-instance-list have been considered. If this is affirmative, then the sub-routine continues to step 338. If not, then step 337 retrieves the next feature of the Examined-case-list, instance from the Examined-instance-list, names it Second-feature and continues to step 334. Step 338 determines whether all features of the input-instance have been considered. If this is affirmative, then the sub-routine continues to step 340. However, if step 338 determined that all the features of the input-instance have not been considered, then step 339 retrieves the next feature of the input-instance, names it First-feature and continues to step 333.

Step 340 determines whether the Gen-pattern is empty. If the Gen-pattern is not empty, then the occurrence of Gen-pattern is made 2 and the subroutine GET-GEN-PATTERN returns in step 343 after producing as output Gen-pattern in step 342. If step 340 determines that Gen-pattern is empty, the sub-routine GET-GEN-PATTERN also returns in step 343.

The methods of FIG. 4 and FIGS. 7A to 7F may alternatively be implemented in dedicated hardware such as one or more integrated circuits performing the functions or sub functions of FIG. 4 and FIGS. 7A to 7F. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiment being illustrative and not restrictive.

We claim:

1. A computer-implemented method of predicting a decision of a user based on previous behaviour by the user for a specified context, said method being performed by at least one computer and comprising the steps of:
   (a) receiving user behaviour patterns, each of the user behaviour patterns including attribute information, a user decision, and a frequency of occurrence;
   (b) comparing each attribute of the specified context with each of the attribute information of the user behaviour patterns to determine a number of matched attributes;
   (c) forming groups of behaviour patterns based upon the number of matched attributes; and (d) performing a decision selecting process for a group of behaviour patterns having a highest number of matched attributes to thereby select a decision that is most appropriate to the specified context from the user behaviour patterns, wherein the selected decision corresponds to a prediction of an action preferred by the user.

2. A method according to claim 1, further comprising the step of:

(e) forming sub-groups of the user behaviour patterns for each of the groups of behaviour patterns, wherein each of the sub-groups includes unique attributes, and wherein the decision selecting process selects a decision from the user behaviour patterns having a highest frequency of occurrence in each of the sub-groups for the group of behaviour patterns having the highest number of matched attributes.

3. A method according to claim 2, wherein each of the user decisions of the user behaviour patterns is assigned a decision value and the decision selecting process includes a calculating process for calculating an average of the decision values of the user behaviour patterns having the highest frequency of occurrence in each of the sub-groups and selects a decision from the user behaviour patterns that is closest to the average.

4. A method according to claim 3, wherein the decision selecting process includes a determining process for determining a decision interval from a predefined group of decision intervals that is closest to the average, the decision interval being defined by the group of decision values, and selects a decision from a sub-group that is within the determined decision interval, the selected decision having the highest frequency of occurrence.

5. A method according to claim 3, wherein the decision selecting process includes a determining process for determining a decision interval from a predefined group of decision intervals that is closest to the average, the decision interval being defined by the group of decision values, and selects a most specific decision from a sub-group that is within the determined decision interval.

6. A method according to claim 5, wherein the decision selecting process selects a decision having the highest frequency of occurrence, in a case in which the decision selecting process is unable to select a most specific decision.

7. A method according to claim 3, wherein the decision selecting process includes the steps of:

if the decision selecting process is unable to select a unique decision from the user behaviour patterns having the highest frequency of occurrence in each of the sub-groups, then selecting a decision having a highest number of corresponding entries in a decision list.

8. A method according to claim 7, wherein the decision selecting process includes the steps of:

if the decision selecting process is unable to select a unique decision having a highest number of corresponding entries in the decision list, then adding all entries of the sub-groups associated with the highest number of matched attributes to the decision list; and repeating the decision selecting process with a sub-group associated with a group with a next highest number of matched attributes.

9. A method according to claim 8, wherein the decision selecting process includes the steps of:

if the decision selecting process is unable to select a unique decision after performing the repeating step, then calculating an average of decision values of user behaviour patterns in the decision list;

determining which decision interval from a predefined group of decision intervals is closest to the average calculated for the decision list; and selecting a decision from the decision list that is within the decision interval and having a highest rate of occurrence.

10. A method according to claim 1, wherein the specified context is a plurality of entertainment programs available to the user.

11. A computer-implemented method of predicting a decision of a user based on previous behaviour by the user for a specified context, said method being performed by at least one computer and comprising the steps of:

(a) receiving user behaviour patterns, each of the user behaviour patterns including a user decision having an assigned decision value and a frequency of occurrence;

(b) comparing the specified context with each of the user behaviour patterns to determine a number of intersections for each of the user behaviour patterns with the specified context;

(c) forming groups of the user behaviour patterns, each of the groups having a same number of intersections;

(d) for each of the groups, forming sub-groups of the user behaviour patterns, with each of the sub-groups including unique intersections;

(e) for a group having a highest number of intersections, calculating an average of decision values corresponding to those user behaviour patterns having a highest frequency of occurrence in corresponding sub-groups;

(f) determining a decision interval from a predefined group of decision intervals that is closest to the average; and (g) selecting a decision from a sub-group that is within the determined decision interval, the selected decision having a highest frequency of occurrence, wherein the selected decision corresponds to a prediction of an action preferred by the user.

12. A method as claimed in claim 11, further comprising the step of:

(h) if step (g) is unable to select a unique decision, then selecting a decision from one of the decisions selected in step (g) that has a highest number of corresponding entries in a decision list.

13. A method as claimed in claim 12, further comprising the steps of:

(I) if step (h) is unable to select a unique decision, then adding all entries of a sub-group associated with the group with the highest number of intersections to the decision list; and (j) repeating steps (e) to (i) with a sub-group associated with a group with a next highest number of intersections.

14. A method as claimed in claim 13, further comprising the steps of:

(k) if step (j) is unable to select a unique decision, then calculating an average of decision values of user behaviour patterns in the decision list;

(l) determining which decision interval from the predefined group of decision intervals is closest to the average calculated in step (k); and (m) selecting a decision from the decision list that is within the decision interval and having a highest rate of occurrence.

15. A method as claimed in claim 11, wherein each of the user behaviour patterns includes context data, with the context data being common to a context when the corresponding user decision was made.

16. A method according to claim 11, wherein the specified context is a plurality of entertainment programs available to the user.

17. An apparatus for predicting a decision of a user based on previous behaviour by the user for a specified context, said apparatus including at least one computer and comprising:
   means for receiving user behaviour patterns, each of the user behaviour patterns including attribute information, a user decision, and a frequency of occurrence;
   means for comparing each attribute of the specified context with each of the attribute information of the user behaviour patterns to determine a number of matched attributes;
   means for forming groups of behaviour patterns based upon the number of matched attributes; and
   means for performing a decision selecting process for a group of behaviour patterns having a highest number of matched attributes, the decision selecting process operating to select a decision that is most appropriate to the specified context from the user behaviour patterns,
   wherein the selected decision corresponds to a prediction of an action preferred by the user.

18. An apparatus according to claim 17, further comprising:
   means for forming sub-groups of the user behaviour patterns for each of the groups of behaviour patterns, wherein each of the sub-groups includes unique attributes, and
   wherein the decision selecting process selects a decision from the user behaviour patterns having a highest frequency of occurrence in each of the sub-groups for the group of behaviour patterns having the highest number of matched attributes.

19. An apparatus according to claim 18, wherein each of the user decisions of the user behaviour patterns is assigned a decision value and the decision selecting process includes calculating process for calculating an average of the decision values of the user behaviour patterns having the highest frequency of occurrence in each of the sub-groups and selects a decision from the user behaviour patterns that is closest to the average.

20. An apparatus according to claim 19, wherein the decision selecting process includes a determining process for determining a decision interval from a predefined group of decision intervals that is closest to the average, the decision interval being defined by the group of decision values, and selects a decision from a sub-group that is within the determined decision interval, the selected decision having a highest frequency of occurrence.

21. An apparatus according to claim 19, wherein the decision selecting process includes a determining process for determining a decision interval from a predefined group of decision intervals that is closest to the average, the decision interval being defined by the group of decision values, and selects a most specific decision from a sub-group that is within the determined decision interval.

22. An apparatus according to claim 21, wherein the decision selecting process selects a decision having the highest frequency of occurrence, in a case in which the decision selecting process is unable to select a most specific decision.

23. An apparatus according to claim 19, wherein the decision selecting process includes:
   if the decision selecting process is unable to select a unique decision from the user behaviour patterns having the highest frequency of occurrence in each of the sub-groups, then selecting a decision having a highest number of corresponding entries in a decision list.

24. An apparatus according to claim 23, wherein said decision selecting process includes:
   if the decision selecting process is unable to select a unique decision having a highest number of corresponding entries in the decision list, then adding all entries of the sub-groups associated with the highest number of matched attributes to the decision list; and
   repeating the decision selecting process with a sub-group associated with a group with a next highest number of matched attributes.

25. An apparatus according to claim 24, wherein the decision selecting process includes:
   if the decision selecting process is unable to select a unique decision after performing repeating the decision selecting process, then calculating an average of decision values of user behaviour patterns in the decision list;
   determining which decision interval from a predefined group of decision intervals is closest to the average calculated for the decision list; and
   selecting a decision from the decision list that is within the decision interval and having a highest rate of occurrence.

26. An apparatus according to claim 17, wherein the specified context is a plurality of entertainment programs available to the user.

27. An apparatus for predicting a decision of a user based on a previous behaviour by the user for a specified context, said apparatus including at least one computer and comprising:
   means for receiving user behaviour patterns, each of the user behaviour patterns including a user decision having an assigned decision value and a frequency of occurrence;
   means for comparing the specified context with each of the user behaviour patterns to determine a number of intersections for each of the user behaviour patterns with the specified context;
   means for forming groups of the user behaviour patterns, each of the groups having a same number of intersections;
   means for forming, for each of the groups, sub-groups of the user behaviour patterns, with each of the sub-groups including unique intersections;
   means for calculating, for a group having a highest number of intersections, an average of decision values corresponding to those user behaviour patterns having a highest frequency of occurrence in corresponding sub-groups;
   means for determining a decision interval from a predefined group of decision intervals that is closest to the average; and
   means for selecting a decision from a sub-group that is within the determined decision interval, the selected decision having a highest frequency of occurrence,
   wherein the selected decision corresponds to a prediction of an action preferred by the user.

28. An apparatus as claimed in claim 27, wherein each of the user behaviour patterns includes context data, the context data being common to a context when the corresponding user decision was made.

29. An apparatus according to claim 27, wherein the specified context is a plurality of entertainment programs available to the user.

30. A storage medium storing a program for controlling a computer to predict a decision of a user based on previous behaviour by the user for a specified context, the program comprising:
   code for receiving user behaviour patterns, each of the user behaviour patterns including attribute information, a user decision, and a frequency of occurrence;
   code for comparing each attribute of the specified context with each of the attribute information of the user behaviour patterns to determine a number of matched attributes;
   code for forming groups of the user behaviour patterns based upon the number of matched attributes; and
   code for performing a decision selecting process for group of behaviour patterns having a highest number of matched attributes, the decision selecting process operating to select a decision that is most appropriate to the specified context from the user behaviour patterns,
   wherein the selected decision corresponds to a prediction of an action preferred by the user.

31. A storage medium according to claim 30, wherein the program further comprises:
   code for forming sub-groups of the user behaviour patterns for each of the groups of behaviour patterns,
   wherein each of the sub-groups includes unique attributes, and
   wherein the decision selecting process selects a decision from the user behaviour patterns having a highest frequency of occurrence in each of the sub-groups for the group of behaviour patterns having the highest number of matched attributes.

32. A storage medium according to claim 31, wherein each of the user decisions of the user behaviour patterns is assigned a decision value and the decision selecting process includes a calculating process for calculating an average of the decision values of the user behaviour patterns having the highest frequency of occurrence in each of the sub-groups and selects a decision from the user behaviour patterns that is closest to the average.

33. A storage medium according to claim 32, wherein the decision selecting process includes a determining process for determining a decision interval from a predefined group of decision intervals that is closest to the average, the decision interval being defined by the group of decision values, and selects a decision from a sub-group that is within the determined decision interval, the selected decision having a highest frequency of occurrence.

34. A storage medium according to claim 32, wherein the decision selecting process includes a determining process for determining a decision interval from a predefined group of decision intervals that is closest to the average, the decision interval being defined by the group of decision values, and selects a most specific decision from a sub-group that is within the determined decision interval.

35. A storage medium according to claim 34, wherein the decision selecting process selects a decision having the highest frequency of occurrence in a case in which the decision selecting process is unable to select a most specific decision.

36. A storage medium according to claim 32, wherein the decision selecting process includes:
   if the decision selecting process is unable to select a unique decision from the user behaviour patterns having the highest frequency of occurrence in each of the sub-groups, then selecting a decision having a highest number of corresponding entries in a decision list.

37. A storage medium according to claim 36, wherein the decision selecting process includes:
   if the decision selecting process is unable to select a unique decision having a highest number of corresponding entries in the decision list, then adding all entries of the sub-groups associated with the highest number of matched attributes to the decision list; and
   repeating the decision selecting process with a sub-group associated with a group with a next highest number of matched attributes.

38. A storage medium according to claim 37, wherein said decision selecting process includes:
   if the decision selecting process is unable to select a unique decision after repeating the decision selecting process, then calculating an average of decision values of user behaviour patterns in the decision list;
   determining which decision interval from a predefined group of decision intervals is closest to the average calculated for the decision list; and
   selecting a decision from the decision list that is within the decision interval and having a highest rate of occurrence.

39. A storage medium storing a program for controlling a computer to predict a decision of a user based on previous behaviour by the user for a specified context, the program comprising:
   code for receiving user behaviour patterns, each of the user behaviour patterns including a user decision having an assigned decision value and a frequency of occurrence;
   code for comparing the specified context with each of the user behaviour patterns to determine a number of intersections for each of the user behaviour patterns with the specified context;
   code for forming groups of the user behaviour patterns, each of the groups of user behaviour patterns having a same number of intersections;
   code for, for each of the groups of user behaviour patterns, forming sub-groups of the user behaviour patterns, with each of the sub-groups including unique intersections;
   code for, for a group having a highest number of intersections, calculating an average of decision values corresponding to those user behaviour patterns having a highest frequency of occurrence in corresponding sub-groups;
   code for determining a decision interval from a predefined group of decision intervals that is closest to the average; and
   code for selecting a decision from a sub-group that is within the determined decision interval, the selected decision having a highest frequency of occurrence,
   wherein the selected decision corresponds to a prediction of an action preferred by the user.

40. A storage medium as claimed in claim 39, wherein each of the user behaviour patterns includes context data, the context data being common to a context when the corresponding user decision was made.

* * * * *

UNITED STATES PATENT AND TRADEMARK OFFICE
CERTIFICATE OF CORRECTION

| | |
|---|---|
| PATENT NO. | : 7,054,849 B2 |
| APPLICATION NO. | : 10/128481 |
| DATED | : May 30, 2006 |
| INVENTOR(S) | : Mikhael Prokopenko et al. |

It is certified that error appears in the above-identified patent and that said Letters Patent is hereby corrected as shown below:

ON TITLE PAGE
<u>ITEM [75] INVENTORS</u>

"Ryszard Kowalczyk, Carlton (AU);" should read
--Ryszard Kowalczyk, Clayton (AU);--.

<u>COLUMN 1</u>

Line 61, "sad" should read --said--.

<u>COLUMN 3</u>

Line 34, "sequences" should read --sequence--.
Line 59, "miner" should read --manner--.

<u>COLUMN 4</u>

Line 10, "email" should read --e-mail--.
Line 65, "email:" should read --e-mail:--.

<u>COLUMN 5</u>

Line 1, "is" should read --are--.

<u>COLUMN 6</u>

Line 47, "has" should read --have--.

<u>COLUMN 7</u>

Line 6, "took" should read --taken--.
Line 30, "has" should read --have--.

<u>COLUMN 9</u>

Line 51, "aim" should read --aims--.

UNITED STATES PATENT AND TRADEMARK OFFICE
CERTIFICATE OF CORRECTION

| | |
|---|---|
| PATENT NO. | : 7,054,849 B2 |
| APPLICATION NO. | : 10/128481 |
| DATED | : May 30, 2006 |
| INVENTOR(S) | : Mikhael Prokopenko et al. |

It is certified that error appears in the above-identified patent and that said Letters Patent is hereby corrected as shown below:

COLUMN 10

Line 12, ")intervals" should read --intervals--.
    Line 30, "includes" should read --include--.
    Line 56, "RPList," should read --BPList,--.

COLUMN 11

Line 1, "sub-clusters" should read --sub-cluster--.

COLUMN 12

Line 35, "has" should read --have--.
    Line 58, "ally" should read --any--.

COLUMN 13

Line 29, "window" should read --windows--.

COLUMN 14

Line 28, "example" should read --example.--.
    Line 40, "have" should read --has--.
    Line 52, "response" should read --response.--.

COLUMN 15

Line 4, "Content" should read --Content.--.
    Line 12, "ie." should read --is, for example,--.
    Line 25, "tie" should read --the--.
    Line 55, "Alteniatively," should read --Alternatively,--.
    Line 56, "taken based" should read --taken is based--.

COLUMN 16

Line 24, "both" should read --both.--.

COLUMN 17

Line 18, "naria" should read --naria.--.

UNITED STATES PATENT AND TRADEMARK OFFICE
CERTIFICATE OF CORRECTION

PATENT NO. : 7,054,849 B2
APPLICATION NO. : 10/128481
DATED : May 30, 2006
INVENTOR(S) : Mikhael Prokopenko et al.

It is certified that error appears in the above-identified patent and that said Letters Patent is hereby corrected as shown below:

COLUMN 18

Line 39, "source=avatar," should read --source=avatar.--.
    Line 42, "is a" should read --if a--.
    Line 49, "cotresponding" should read --corresponding--.

COLUMN 19

Line 9, "ail" should read --an--.
    Line 13, "Sub-routing" should read --Subroutine--.
    Line 16, "Sub-routing" should read --Subroutine--.
    Line 33, "is the behaviour patterns and" should read --is the list of behavior patterns--.

COLUMN 20

Line 9, "it's" should read --its--.
    Line 19, "it's" should read --its--.
    Line 36, "has" should read --have--.
    Line 40, "were" should read --have been--.
    Line 44, "create" should read --creates--.

COLUMN 21

Line 32, "it's" should read --its--.
    Line 53, "match" should read --matches--.
    Line 56, "find" should read --finds--.
    Line 57, "match" should read --matches--.

COLUMN 22

Line 6, "a" should read --an--.
    Line 44, "sub" should read --sub- --.

COLUMN 23

Line 47, "steps" should read --step--.

COLUMN 24

Line 48, "(I)" should read --(i)--.

UNITED STATES PATENT AND TRADEMARK OFFICE
CERTIFICATE OF CORRECTION

PATENT NO. : 7,054,849 B2
APPLICATION NO. : 10/128481
DATED : May 30, 2006
INVENTOR(S) : Mikhael Prokopenko et al.

It is certified that error appears in the above-identified patent and that said Letters Patent is hereby corrected as shown below:

COLUMN 25

Line 39, "includes" should read --includes a--.

COLUMN 27

Line 17, "for group" should read --for a group--.

Signed and Sealed this

Twentieth Day of February, 2007

JON W. DUDAS
*Director of the United States Patent and Trademark Office*